(12) United States Patent
Berduque et al.

(10) Patent No.: US 12,742,749 B2
(45) Date of Patent: Sep. 22, 2026

(54) SYSTEMS, SENSOR ASSEMBLIES AND METHODS

(71) Applicant: Analog Devices International Unlimited Company, Limerick (IE)

(72) Inventors: Alfonso Berduque, Crusheen (IE); Alan O'Donnell, Castletroy (IE); Simone Mullins, Limerick (IE); Joyce Wu, Somerville, MA (US); Junfei Xia, Andover, MA (US); Richard Doyle, Churchtown (IE)

(73) Assignee: Analog Devices International Unlimited Company, Limerick (IE)

( * ) Notice: Subject to any disclaimer, the term of this patent is extended or adjusted under 35 U.S.C. 154(b) by 254 days.

(21) Appl. No.: 18/762,515

(22) Filed: Jul. 2, 2024

(65) Prior Publication Data

US 2025/0012759 A1 Jan. 9, 2025

Related U.S. Application Data

(60) Provisional application No. 63/512,198, filed on Jul. 6, 2023.

(51) Int. Cl.
*G01N 27/41* (2006.01)
*G01N 27/416* (2006.01)

(52) U.S. Cl.
CPC ................................ *G01N 27/4163* (2013.01)

(58) Field of Classification Search
CPC ......... G01N 27/4163; B01L 2300/0645; B01L 2300/0851; B01L 2300/0858;
(Continued)

(56) References Cited

U.S. PATENT DOCUMENTS 3,675,501 A 7/1972 De Kanter
4,267,509 A 5/1981 Graham
(Continued)

FOREIGN PATENT DOCUMENTS

AT 511171 A1 9/2012
CN 114152593 A 3/2022
(Continued)

OTHER PUBLICATIONS

Bubbles no more in plane trapping and removal of bubbles in microfluidic devices (Lab on Chip Dec. 2011).
(Continued)

*Primary Examiner* — Francis C Gray
(74) *Attorney, Agent, or Firm* — ArentFox Schiff LLP

(57) ABSTRACT

The present disclosure provides methods and systems for reducing interference by one or more bubbles in a sensing assembly. Bubble prevention arrangements can use surfaces located in a fluid channel to provide surfaces with higher affinity for bubbles relative to the other surfaces so that the surface retains one or more bubbles within a bubble collection region; and/or to divert at least a portion of any bubbles passing through an opening in the fluid channel. Additionally or alternatively, bubble prevention arrangements comprise an agitation device configured to agitate liquid within the fluid channel. Additionally or alternatively, bubble prevention arrangements are configured to displace one or more bubbles in a region on or adjacent the sensing surface so as to reduce interference of one or more bubbles on the sensing surface.

20 Claims, 10 Drawing Sheets

(58) Field of Classification Search

CPC ......... B01L 2300/165; B01L 3/502723; B01L 2200/0684; B01L 2300/1811; B01L 2300/1827; B01L 2400/0436; B01L 2400/0439; B01L 2400/0442; B01L 2400/046

See application file for complete search history.

(56) References Cited

U.S. PATENT DOCUMENTS

| | | | | |
|---|---|---|---|---|
| 6,030,118 | A | 2/2000 | Schneider et al. | |
| 7,048,890 | B2 | 5/2006 | Coehoorn et al. | |
| 7,547,415 | B2 | 6/2009 | Hataoka et al. | |
| 7,609,054 | B2 | 10/2009 | Tondra et al. | |
| 9,513,246 | B2 | 12/2016 | O'Donnell et al. | |
| 9,841,421 | B2 | 12/2017 | Dittmer et al. | |
| 10,357,771 | B2 | 7/2019 | Bharadwaj et al. | |
| 11,061,086 | B2 | 7/2021 | O'Donnell et al. | |
| 11,525,820 | B2 | 12/2022 | Meier et al. | |
| 11,666,913 | B2 | 6/2023 | Beaumont et al. | |
| 11,788,646 | B1 | 10/2023 | Huff | |
| 2003/0000833 | A1 | 1/2003 | Mansouri et al. | |
| 2008/0317632 | A1* | 12/2008 | Shimasaki | B01D 19/0031 422/68.1 |
| 2009/0026080 | A1 | 1/2009 | Han et al. | |
| 2010/0089133 | A1 | 4/2010 | Yamasaki et al. | |
| 2012/0079981 | A1 | 4/2012 | Huffman et al. | |
| 2013/0085687 | A1 | 4/2013 | Danov et al. | |
| 2013/0105581 | A1 | 5/2013 | Kwon et al. | |
| 2013/0335492 | A1* | 12/2013 | Edombingo | B41J 2/19 347/92 |
| 2014/0026649 | A1 | 1/2014 | O'Donnell et al. | |
| 2014/0273187 | A1 | 9/2014 | Johnson et al. | |
| 2014/0374854 | A1 | 12/2014 | Xue | |
| 2018/0038737 | A1 | 2/2018 | Hedlund et al. | |
| 2020/0072783 | A1 | 3/2020 | Berney et al. | |
| 2021/0060566 | A1* | 3/2021 | Corey | B01L 3/502723 |
| 2021/0325484 | A1 | 10/2021 | Pellegrino et al. | |
| 2022/0219171 | A1 | 7/2022 | Siltanen et al. | |
| 2022/0362778 | A1 | 11/2022 | Foster et al. | |
| 2022/0371019 | A1 | 11/2022 | Mei et al. | |
| 2023/0085052 | A1 | 3/2023 | Klein et al. | |
| 2023/0098962 | A1 | 3/2023 | O'Donnell et al. | |
| 2023/0152166 | A1 | 5/2023 | O'Donnell et al. | |
| 2025/0012759 | A1* | 1/2025 | Berduque | G01N 27/4163 |

FOREIGN PATENT DOCUMENTS

| | | | | |
|---|---|---|---|---|
| EP | 1855114 | A1 | 11/2007 | |
| EP | 2413128 | A1 | 2/2012 | |
| EP | 3896470 | A1 | 10/2021 | |
| JP | 2007-245038 | A | 9/2007 | |
| JP | 5261124 | B2 | 8/2013 | |
| KR | 20190070635 | A | 6/2019 | |
| KR | 102039230 | B1 * | 10/2019 | B01L 3/502715 |
| WO | 2012/013814 | A1 | 2/2012 | |
| WO | WO-2016143278 | A1 * | 9/2016 | G01N 21/05 |

OTHER PUBLICATIONS

Cilia Metasurfaces for electronically programmable microfluidic manipulation (Nature vol. 605 May 25, 2022).

Wataru Iwasaki et al., Development of a Thermoresponsive Valve Membrane for Microfluic Paper-based Analytical Device.

Mohsen Annabestani, et al., Ionic Electro Active Polymer-Based Soft Actuators and their Applications in Mircrofluidic Micropumps, Microvalves, and Micromixers: A Review.

Edwin W.H.Jager et al., Electroactive Surfaces based on Conducting Polymers for Controlling Cell Adhesion, Signaling, and Proliferation.

Y.Lee, et al., Flow Characteristics of Hydrophilic/Hydrophobic Capillaries Considering Surface Tension.

Philippe Dubois et al., "Microactuators based on ION-Implanted Dielectric Electroactive Polymer Membranes (EAP)".

T.Zhang et al., Microfluidic Valves based on TiO2 Coating with Tunable Surface Wettability between Super Hydrophilic and Super Hydrophobic.

Extended European Search Report issued in corresponding European Application No. 24185018 dated Mar. 31, 2025.

Partial Search Report issued in corresponding European Application No. 24185018 dated Jan. 8, 2025.

Chung et al., "On-chip creation and elimination of microbubbles for a micro-object manipulator", J. Micromech. Microeng., vol. 18, 2008, pp. 1-13.

Extended European Search Report received for European Application No. 24185020.5, mailed on Nov. 15, 2024, 9 pages.

Satoh et al., "On-chip microfluidic transport and bio/chemical sensing based on electrochemical bubble formation", Sensors and Actuators B, vol. 123, 2007, pp. 1153-1160.

* cited by examiner 105
145B
110
115
112
1
1
145
145A
105

105
145B
145
145A
106
150
100

200
245A
245
245B
205
247

345
360

345'
360'

345"
361"
369"
363"
360"

545
561
562
560A
568

568'''
562'''

561'''
568''''
562''''
561''''

568
567
560A
545

568'
561'
562'

568''
562''
561''

600
645A
605
615
1
662
661
660
660C
663
664
645A
645

700
760

700
705
715
710
760

SYSTEMS, SENSOR ASSEMBLIES AND METHODS

CROSS-REFERENCE TO RELATED APPLICATIONS

This application claim priority from U.S. Provisional Application No. 63/512,198, filed Jul. 6, 2023, the entirety of which is incorporated by reference herein.

FIELD OF THE DISCLOSURE

This disclosure relates to a method and system for reducing interference by one or more bubbles in a sensing assembly, for example in a sensor assembly for sensing a property of a sample.

BACKGROUND

Electrical sensors, such as electrochemical sensors, which measure the properties of liquids can be prone to interference from bubbles. For example, in the context of an electrochemical sensor, bubbles on or over a sensing surface may interfere with the interaction of the surface with the surrounding liquid and reduce or inhibit the available electrode area and, therefore, interfere with the measurement (e.g. precision) and the reduction in area will affect the measurement accuracy. If the bubbles or collection/concentration of gas formed are too large, the sensor may stop working. The bubbles may be formed due to device topography (corners, protrusions, recesses), surface tension forces, hydrophilicity-hydrophobicity difference between the fluid and the device surface, opening or breaks in a fluid pathway, material properties related to the electrode or channel construction or user error.

In some cases, these sensors will be in systems which include microfluidic channels, tracks or vias and these can exacerbate the generation of bubbles and are also prone to interference in the flow from bubbles. Bubbles can form, for example, in corners and on surfaces in microfluidic systems. These can interfere with the flow through the microfluidic channels or components (e.g. valves) and/or be transferred downstream and directly interfere with the sensors. The interference caused by bubbles/unwanted gas formation is increasingly disruptive as sensor assemblies are miniaturised, as the formation is increased and the interference amplified.

SUMMARY OF THE DISCLOSURE

The present disclosure provides methods and systems for reducing interference by one or more bubbles in a sensing assembly. Bubble prevention arrangements can use surfaces located in a fluid channel to provide surfaces with higher affinity for bubbles relative to the other surfaces so that the surface retains one or more bubbles within a bubble collection region; and/or to divert at least a portion of any bubbles passing through an opening in the fluid channel. Additionally or alternatively, bubble prevention arrangements comprise an agitation device configured to agitate liquid within the fluid channel. Additionally or alternatively, bubble prevention arrangements are configured to displace one or more bubbles in a region on or adjacent the sensing surface so as to reduce interference of one or more bubbles on the sensing surface.

In a first aspect, a system for reducing interference by one or more bubbles in a liquid in a sensing assembly comprises:

- a sensing assembly comprising a sensing surface, the sensing surface being configured to receive the liquid and the sensing assembly configured to provide a measurement signal indicative of an interaction of the sensing surface with the liquid;
- a fluid channel defining a flow path configured to provide liquid to the sensing surface, the fluid channel comprising a first surface; and
- a bubble prevention arrangement arranged in and/or fluidly connected to the fluid channel for preventing one or more bubbles from interfering with the sensing surface, the bubble prevention arrangement comprising a bubble collection region in which one or more bubbles can be collected,
- wherein the bubble prevention arrangement comprises a second surface located in the fluid channel; and
- wherein:
- the bubble collection region comprises the second surface and the second surface has a higher affinity for bubbles relative to the first surface so that the second surface retains one or more bubbles within the bubble collection region; and/or
- the bubble collection region is separate to and fluidly connected to the fluid channel via an opening in the fluid channel and the second surface is configured to divert at least a portion of any bubbles passing through the fluid channel to the opening.

In a second aspect, a system for reducing interference by one or more bubbles in a sensing assembly comprises:

- a sensing assembly comprising a sensing surface, the sensing surface being configured to receive the liquid and the sensing assembly configured to provide a measurement signal indicative of an interaction of the sensing surface with the liquid;
- a fluid channel defining a flow path configured to provide liquid to the sensing surface; and
- a bubble collection region in which one or more bubbles can be collected; and
- a bubble prevention arrangement comprising an agitation device configured to agitate liquid within the fluid channel so as to:
  - cause dissolved gases in the liquid in the fluid channel to form bubbles, wherein the agitation device is arranged so that at least a portion of the formed bubbles can be collected in the bubble collection region; and/or
  - direct one or more bubbles in the liquid to the bubble collection region.

In a third aspect, there is provided a system for reducing interference by one or more bubbles in a liquid in a sensing assembly, the system comprising:

- a sensing assembly comprising a sensing surface, the sensing surface being configured to receive the liquid and the sensing assembly configured to provide a measurement signal indicative of an interaction of the sensing surface with the liquid; and
- a bubble prevention arrangement arranged adjacent or on the sensing surface and configured to displace one or more bubbles in a region on or adjacent the sensing surface so as to reduce interference of one or more bubbles on the sensing surface.

In a fourth aspect, a method for reducing the interference of bubbles in a system for determining a property of a liquid comprises:

- providing a system according to any of the aspects or embodiments disclosed herein;
- providing a liquid to the sensing surface;

removing bubbles and/or dissolved gas from the liquid using the bubble prevention arrangement; and determining a property of the liquid using the sensing assembly.

BRIEF DESCRIPTION OF THE DRAWINGS

The present disclosure will now be described in more detail with reference to the accompanying drawings, which are not intended to be limiting.

DETAILED DESCRIPTION

Figures 1, 2:
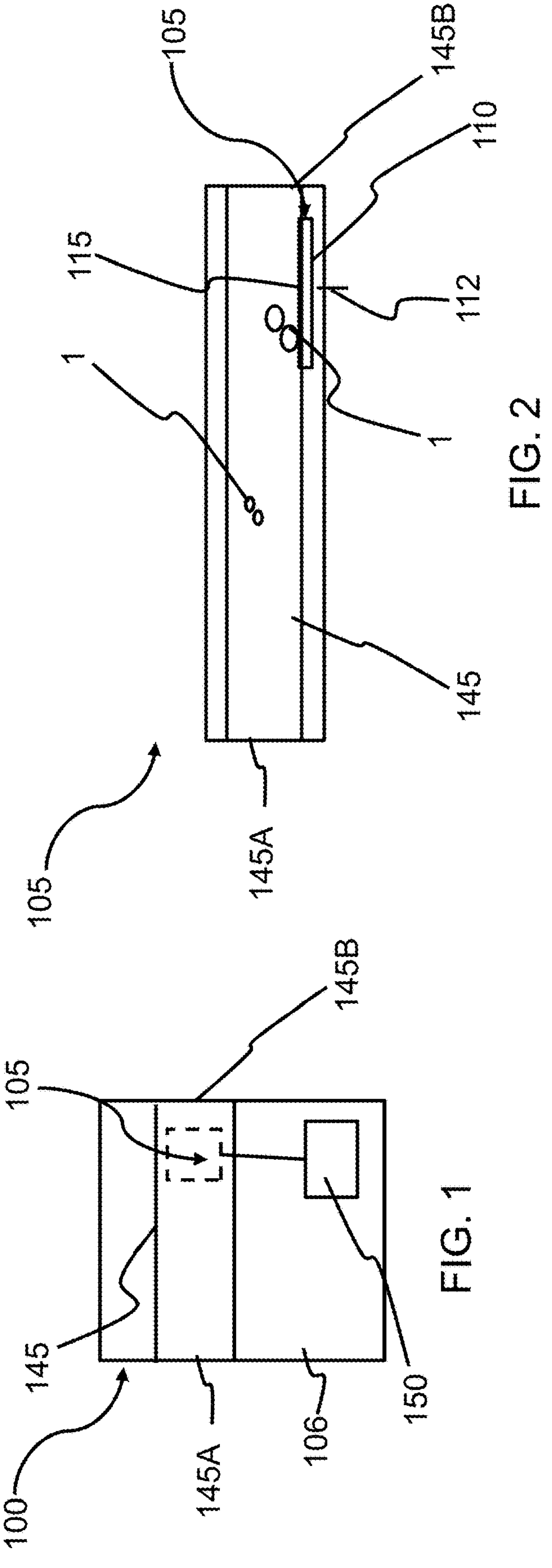
FIG. 1 provides a schematic plan view of a system.
FIG. 2 provides a schematic cross-sectional view of a part of the system of FIG. 1.

Electrical sensors, such as electrochemical sensors, when used with liquids can be susceptible to interference by bubbles or the formation of gases in specific areas or locations. For example, bubbles on or over a sensing surface will interfere with the interaction of the surface with the surrounding liquid and thereby reduce the available sensing surface area. This not only interferes with the measurement, generally, but the reduction in surface area available for measurement will affect quantification calculations. If the bubbles are too large, the sensor may stop working. The bubbles may be formed due to device topography (corners, protrusions, recesses), surface tension forces, hydrophilicity-hydrophobicity difference between the fluid and the device surface, opening or breaks in a fluid pathway, or user error. In some cases, this may be within a microfluidic channel, which may also be prone to interference in the flow from bubbles. Bubbles can form, for example, in corners and on surfaces in microfluidic systems and particularly where these are complex.

In a first aspect, a system for reducing interference by one or more bubbles in a liquid in a sensing assembly comprises:

a sensing assembly comprising a sensing surface, the sensing surface being configured to receive the liquid and the sensing assembly configured to provide a measurement signal indicative of an interaction of the sensing surface with the liquid;

a fluid channel defining a flow path configured to provide liquid to the sensing surface, the fluid channel comprising a first surface; and a bubble prevention arrangement arranged in and/or fluidly connected to the fluid channel for preventing one or more bubbles from interfering with the sensing surface, the bubble prevention arrangement comprising a bubble collection region in which one or more bubbles can be collected, wherein the bubble prevention arrangement comprises a second surface located in the fluid channel; and wherein:

the bubble collection region comprises the second surface and the second surface has a higher affinity for bubbles relative to the first surface so that the second surface retains one or more bubbles within the bubble collection region; and/or the bubble collection region is separate to and fluidly connected to the fluid channel via an opening in the fluid channel and the second surface is configured to divert at least a portion of any bubbles passing through the fluid channel to the opening.

In a second aspect, a system for reducing interference by one or more bubbles in a sensing assembly comprises:

a sensing assembly comprising a sensing surface, the sensing surface being configured to receive the liquid and the sensing assembly configured to provide a measurement signal indicative of an interaction of the sensing surface with the liquid;

a fluid channel defining a flow path configured to provide liquid to the sensing surface; and a bubble collection region in which one or more bubbles can be collected; and a bubble prevention arrangement comprising an agitation device configured to agitate liquid within the fluid channel so as to:

cause dissolved gases in the liquid in the fluid channel to form bubbles, wherein the agitation device is arranged so that at least a portion of the formed bubbles can be collected in the bubble collection region; and/or direct one or more bubbles in the liquid to the bubble collection region.

In a third aspect, there is provided a system for reducing interference by one or more bubbles in a liquid in a sensing assembly, the system comprising:

a sensing assembly comprising a sensing surface, the sensing surface being configured to receive the liquid and the sensing assembly configured to provide a measurement signal indicative of an interaction of the sensing surface with the liquid; and a bubble prevention arrangement arranged adjacent or on the sensing surface and configured to displace one or more bubbles in a region on or adjacent the sensing surface so as to reduce interference of one or more bubbles on the sensing surface.

In a fourth aspect, a method for reducing the interference of bubbles in a system for determining a property of a liquid comprises:

providing a system according to any of the aspects or embodiments disclosed herein;

providing a liquid to the sensing surface;

removing bubbles and/or dissolved gas from the liquid using the bubble prevention arrangement; and determining a property of the liquid using the sensing assembly.

Embodiments of these aspects provide systems and methods which for reducing the interference in a system and sensing assembly caused by bubbles. Removal of the bubbles from the system can improve the performance and accuracy of the sensor, for example by either clearing a sensing surface of bubbles so that the measurement can be more accurately performed (or in extreme cases, the sensor can function) or by clearing a fluid flow pathway so that sample can reach the sensor reliably and so that the bubbles do not move. In the case of manufacturing a sensing assembly, this can improve the reliability of the manufacturing process by avoiding interference by bubbles when functionalising surfaces or delivering reagents through microfluidic pathways.

With respect to the first, second and fourth aspects in particular, preventing bubbles from interfering with the sensing surface can be through either (1) the retention of at least some of the bubbles in fluid from passing through the fluid channel to the sensing assembly and/or (2) causing the formation and retention of bubbles from dissolved gases present in the fluid so as to prevent formation of bubbles downstream either before or on the surface of the sensing assembly.

With respect to the first aspect, in one embodiment, the bubble collection region comprises the second surface and the second surface has a higher affinity for bubbles relative to the first surface so that the second surface retains bubbles within the bubble collection region. That is, the second surface has a higher affinity for bubbles so that the second surface forms a preferential bubble collection region for the bubbles. This can allow bubbles to be held in predetermined parts of the system (e.g. fluid channel) so as to minimise interference. For example, particular regions of the fluid channel can be provided with a second surface or a plurality of second surfaces where any bubbles are retained and are least likely to interfere with measurements by the sensing assembly. This could be in regions of the fluid channel, such as recesses, or it could be in reservoirs or other secondary fluid channel parts outside of the main flow path defined by the fluid channel. The second surface achieves this by preferential retention of bubbles on the second surface as compared to the first surface, where the first surface may be the remainder of the surfaces in the fluid channel. In embodiments, the fluid channel may have a majority of its surfaces formed of the first surface and may comprise at least one second surface.

In these aspects and embodiments where bubble collection region comprises the second surface and the second surface has a higher affinity for bubbles relative to the first surface so that the second surface retains bubbles within the bubble collection region, the second surface may further be configured to divert bubbles in the liquid to the bubble collection region. In a further embodiment, the bubble collection region is separate to and fluidly connected to the fluid channel via an opening in the fluid channel and the second surface is configured to divert at least a portion of bubbles passing through the fluid channel to the opening. In such embodiments, the second surface may preferentially retain and/or attract bubbles compared to the first surface and divert these bubbles to the bubble collection region.

In other embodiments, the bubble collection region is separate to and fluidly connected to the fluid channel via an opening in the fluid channel and the second surface is configured to divert at least a portion of bubbles passing through the fluid channel to the opening. The second surface accordingly is configured to divert or separate bubbles from the fluid and encourage passage of the bubbles through the opening where they can be retained, out of the fluid pathway and thus reducing the likelihood that they can interfere with the system.

In the second aspect, and in further embodiments of the other aspects, the bubble prevention arrangement comprises an agitation device configured to agitate liquid within the fluid channel so as to: cause dissolved gases in the liquid in the fluid channel to form bubbles, wherein the agitation device is arranged so that at least a portion of the formed bubbles can be collected in the bubble collection region; and/or direct one or more bubbles in the liquid to the bubble collection region. As will be appreciated, one driver for bubble formation is the concentration of dissolved gases in a liquid. Using an agitation device to deliberately form bubbles allows for bubbles to be formed in regions where they can be retained and controlled and can cause a reduction in the concentration of dissolved gases, which can reduce the likelihood of bubble formation in other parts of the system. For example, bubbles can be formed in a region of the system (fluid channel) where they can be retained by the bubble collection region (e.g. where a second surfaces present, the second surface) and the liquid that then continues to the sensing assembly has a lower dissolved gas concentration and, therefore, a lower chance of bubbles being formed in a region where they can interfere with measurement. Where bubbles are present, whether that is formed as a result of the use of the agitation device or were already present in the liquid, the agitation device can alternatively or also be used to divert bubbles to the bubble collection region. Using an agitation device to do this can provide an effective means of separating the bubbles from the liquid. For example, this can apply a directional force on the bubbles to direct them to a particular area, can dislodge bubbles from regions of the fluid channel (e.g. where they may be stuck) or a combination of these.

The bubble prevention arrangement in the third aspect, and in embodiments of the other aspects, is arranged adjacent (i.e. next to or abutting) or on the sensing surface so that bubbles in the region on or adjacent the sensing service can be removed to prevent interference with the sensing surface and any measurement carried out using the sensing surface. This is advantageous in that it may directly reduce or eliminate the number of bubbles on the sensing surface by displacing or moving the bubbles away from the sensing surface.

Fluid Channel

The first and third aspects, and embodiments of the other aspects, include a fluid channel defining a flow path configured to provide liquid to the sensing surface. The fluid channel can comprise or define a first surface. The fluid channel may be a part of sensing device also comprising the sensing assembly or may be a separate fluidic component. The fluid channel may be a single channel or may be a pathway formed of several components. The fluid channel will extend from at least one inlet where the liquid can be provided to the channel and extends to an outlet. It may be an open or closed channel. The sensing assembly may be located in the channel or may be provided at the outlet, or in some cases downstream of the outlet. The first surface may be at least a part of the liquid-contacting surface of the fluid channel (e.g. the internal surfaces of the sidewall(s) defining the channel). In embodiments, the fluid channel may have a majority of its surfaces formed of the first surface and may comprise at least one second surface.

First/Second Surfaces

Embodiments and the first aspect include the bubble prevention arrangement comprising a second surface located in the fluid channel.

In one embodiment, the second surface has a higher affinity for bubbles relative to the first surface so that the second surface retains one or more bubbles within the bubble collection region. By "higher affinity" it is meant that that bubbles formed in the liquid require a greater force to remove them from the second surface than the first surface. This can allow bubbles to be formed and/or held in predetermined parts of the system (e.g. fluid channel) so as to minimise interference. For example, areas within the channel could be made more or less hydrophilic relative to other areas so as to preferentially attract and/or hold bubbles, allowing for preferential retention of bubbles in particular regions and the creation of regions in which bubbles will pass through without retention. In some embodiments, the surface energy of the second surface is different to that of the first surface so as to provide the second surface with a higher affinity for bubbles in the liquid relative to the first surface, for example, lower than the surface energy of the first surface.

In an additional or alternative embodiment, the bubble collection region is separate to and fluidly connected to the fluid channel via an opening in the fluid channel and the second surface is configured to divert at least a portion of any bubbles passing through the fluid channel to the opening. That is, the fluid channel comprises an opening or aperture through a sidewall and the bubble collection region is (separate to but) fluidly connected to the fluid channel through the opening. The second surface is configured/arranged to divert bubbles in liquid which is flowing through the fluid channel into the opening where they are held/retained by the bubble collection region. This can be provided by the shape or arrangement of the second surface which can be used to intercept bubbles in the liquid present in the fluid channel (for example, as they flow past the second surface) and divert or redirect these to and through the opening. That is, in some embodiments, the second surface is shaped to intercept at least a portion of any bubbles in the liquid present in the fluid channel and divert the bubbles to and through the opening. In other or additional embodiments, the surface properties of the second surface, enable the second surface to attract bubbles and/or cause bubbles to adhere to the second so as to divert at least a portion of bubbles from the liquid to the opening. For example, the second surface can be a part of the fluid channel or be a surface in the fluid channel which is sloped/shaped to enable the bubbles to move efficiently away from the channel and be eliminated.

The second surface, and in some cases per surface, can provide the above-mentioned functionality through their surface properties. For example, the second surface and, in some cases first surface, may be configured to provide a particular affinity for bubbles based on the surface properties of the second surface, including a topography, surface area, functionalisation or other surface property which modifies the interaction with bubbles (e.g. surface energy) so as to attract bubbles to and/or retain bubbles on the surface. These can be selected to contribute to the higher affinity. A change in surface energy will change interaction between bubbles and the surface in question. For example, a low surface energy (hydrophobic materials which resist wetting) can lead to bubbles adhering to the materials. In embodiments, the surface energy can selected/achieved by selection of at least one of the material surface area, specific surface area (surface area per unit area or volume), surface roughness, surface topography, and/or use of a coating, surface functionalisation or treatment (e.g. plasma treatment), or a combination of any of these. For example, different surface finishes/micro etches and surface roughening and treatments can be applied to optimise the surface finish/topography, or the surface may be provided with a hydrophobic coating, functionalisation (such as via fluorination or silanization), a plasma treatment, for example, to minimise the possibility of bubbles attaching to the surface in question. This can comprise modifying edges/lines/points where bubbles may be formed or trapped.

In some embodiments, wherein the surface energy of the second surface is lower than the surface energy of the first surface so as to provide the higher affinity. That is, the second surface can be more hydrophobic than the first surface, which may be hydrophilic or less hydrophobic. In some embodiments, the second surface has a water contact angle of at least 90 degrees (hydrophobic), at least 120 degrees, for example 150 degrees. In some embodiments, the first surface as a water contact of 90 degrees or less (hydrophilic), such as 60 degrees or less. In some embodiments, the second surface may be hydrophobic and the first surface may be hydrophilic. This is useful when the second surface acts as a bubble collection region and/or is used to attract and retain bubbles since the bubbles will preferentially retain thereon. In other embodiments, this may be reversed, such that the second surface has a hydrophilic surface and the first surface has a hydrophobic surface. The water contact angle of a water droplet can in some embodiments be measured by the contact angle measurement set out in "Study on the Surface Energy of Graphene by Contact Angle Measurements" Langmuir 2014, 30, 28, 8598-8606 Jul. 1, 2014, which is incorporated herein by reference. Alternatively, ASTM D5946-17, which is incorporated herein by reference, can be used.

Where the surfaces are hydrophilic, such as the first surface, in some embodiments, the first surface comprise a hydrophilic coating to provide a surface with a high surface energy and, therefore, a low affinity for bubbles, for example compared to the second surface. This can be achieved by providing the first surface with a hydrophilic coating, such as a Polyvinylpyrrolidone (PVP) or Polyethylene oxide (PEO) coating. In some embodiments, this may be a temporary treatment, such as applying a solvent, such as an alcohol (e.g. ethanol), to the first surface.

Different techniques/surface treatments can be applied to form or modify the surfaces within the sensing system e.g. etching, micro etching, laser ablation, plating, sputtering, abrasion, electro-forming etc. these treatments can change the profile or topography of the surface resulting in (for example) a serrated or corrugated finish or a surface with pits, recesses etc. The topography can be modified depending on the specifics of the application-certain surface finishes may be more effective for trapping/adhering/retaining bubbles of a specific gas and can be incorporated in specific regions (as disclosed elsewhere herein).

In some embodiments, the bubble collection region is separate to and fluidly connected to the fluid channel via an opening in the fluid channel and the second surface is configured to divert at least a portion of any bubbles passing through the fluid channel to the opening. The second surface can be shaped or arranged so as to intercept and redirect at least a portion of any bubbles in the liquid through the opening and/or wherein the surface properties of the second surface are selected to attract bubbles and/or cause bubbles to adhere thereto so that these can be diverted to the opening.

In some embodiments, the second surface at least partly extends around the opening. In some further embodiments, the second surface may surround (e.g. extend around the circumference of) the opening. In these embodiments, the surface may slope or taper towards the opening to guide bubbles to the opening.

In some embodiments, the system further comprises a modification unit configured to modify the affinity of the sensing (first) surface and/or the second surface to bubbles in the liquid. The surface property of a surface can be modified dynamically, for example, in response to electrical, optical, or mechanical stimuli, for example to temporarily alter the surface property. In embodiments, the modification modifies a surface property of at least one of the first and second surfaces, which surface property affects the affinity of the respective surface to the bubbles. For example, the modification unit can be configured to adjust the hydrophobicity, for example through modifying the material so as to modify the surface energy of the first and/or second surfaces. Other examples include creating a charge on the surface.

In embodiments, the fluid channel may comprise a modifiable material at least partly defining the first surface and/or the fluid channel may comprise a modifiable material at least partly defining the second surface; wherein the changeable material(s) is/are responsive to a stimulus so as to modify a surface property the first and/or second surface, respectively. In these embodiments, the system may further comprise the modification unit set out above, wherein the modification unit is configured to provide the stimulus so as to adjust the surface property of the respective surface. In embodiments, the modifiable materials are electrowettable materials, for example, selected from electrowettable polymers (e.g. poly (ethylene terephthalate)). In other embodiments, electroactive surfaces that can affect how materials adhere to surfaces may be present, such as surfaces coated with or comprising conducting polymer PEDOT [poly(3,4-ethylenedioxythiophone], electronically active 3D-scaffolds based on electro spun PET nano-fibers coated with PEDOT, ion-implanted dielectric electroactive polymer membranes (EAP), Ionic electroactive polymer (i-EAP) soft actuators, ionic polymer-metal composites (IPMC's), conducting polymer actuators (CPA's) and ionic carbon-nanotube based actuators (i-CNTAs) or some other suitable technology or structure capable of deforming a surface that will affect its ability to interact with adjacent material (i.e. fluid, bubbles etc.). Provision of a surface with a switchable or temporary property is advantageous as it allows for the switching between different states in which bubbles can be manipulated or formed. For example, this can enable switching between states in which bubbles are captured/formed on the surface in question and states in which they are released or not retained on the surface in question. In some embodiments, the system comprises a control unit configured to operate the modification unit. In some embodiments, there may further be a detection unit configured to detect the presence of bubbles and the control unit may be configured to operate the modification unit based on the detection of bubbles by the detection unit.

In embodiments, the modification unit can comprise a set of electrodes configured to provide an electrical stimulus to the first second and/or second surface. In alternative or additional embodiments, the modification unit may be configured to apply a thermal stimulus to the first surface and/or second surface. This may be achieved using a set of electrodes. In alternative or additional embodiments, the modification unit may be configured to provide an optical stimulus (e.g. UV light) to the first surface and/or second surface. The fluid channel may, in some embodiments, include a portion which is transparent to the optical stimulus so that the modification unit can be located outside of the fluid channel.

Bubble Collection Region

In some embodiments, the bubble collection region comprises a reservoir, a secondary fluid channel and/or vent fluidly connected to the fluid channel via an opening and the second surface is configured to divert bubbles in the liquid to the opening so that bubbles are provided to the reservoir, a secondary fluid channel and/or vent. These provide regions in which bubbles can be retained and, in some cases, removed from the system entirely. These examples may be combined, for example, such that the bubble collection region comprises a reservoir where the bubbles can be stored and a vent which vents the bubbles from the reservoir at an appropriate time. These can be present as alternative to the second surface having a higher affinity for bubbles than the first or may be in addition to this.

Accordingly, the bubble collection region may comprise a reservoir in which the bubbles can be held, for example, a secondary fluid channel or vessel into which bubbles from the fluid channel are diverted by the second surface. Alternatively or additionally, the bubble collection region may be a vent in the fluid channel or may comprise a vent for venting bubbles from the fluid channel. In some embodiments, the bubble collection region may comprise a secondary fluid channel or vessel into which bubbles from the fluid channel are diverted and may further comprise a vent or opening from the secondary fluid channel or vessel from which bubbles may be vented. Such an opening, and any reservoir or vent, is located adjacent or upstream of the sensing surface so that at least a portion of the bubbles are prevented from reaching the sensing surface.

In some embodiments, where a vent is used, this may be covered with a semi-permeable membrane used to separate the gas from the liquid. Such a membrane may be formed so that gas can disperse through the semi-permeable membrane but liquid may be retained within the system. Gas-permeable, liquid-impermeable membranes, such as silicone can be used. The membrane may also be configured to prevent gas from re-entering the system or this may be controlled by controlling the atmosphere on the opposite side of the membrane to the liquid.

It will be appreciated that in embodiments of the first aspect and in the second and third aspects, the first and second surfaces may have the same properties or, for the second and third aspects, there may be no second surface (having the properties set out in this disclosure). In some embodiments, the first surface and, where the second surface is present, both surfaces may define at least 50% of the interior surface area of the fluid channel, for example, at least 75%, at least 90%, at least 99%. In embodiments, the first surface and, where present, the second surface is/are hydrophobic. This can be useful where the fluid channel is not intended to retain any bubbles and instead is designed to encourage them to flow downstream to e.g. the collection region. In another embodiment, the first surface and, where present, the second surface is/are hydrophilic. This can be useful where the whole fluid channel is used as a bubble trap to prevent bubbles from interfering with the sensing surface.

In embodiments of the second and third aspects, the fluid channel comprises a first surface, the bubble prevention arrangement is arranged in and/or fluidly connected to the fluid channel for preventing one or more bubbles from interfering with the sensing surface, the bubble prevention arrangement comprising the bubble collection region and the bubble prevention arrangement further comprising a second surface located in the fluid channel; and wherein:

the bubble collection region comprises the second surface and the second surface has a higher affinity for bubbles relative to the first surface so that the second surface retains bubbles within the bubble collection region; and/or the bubble collection region is separate to and fluidly connected to the fluid channel via an opening in the fluid channel and the second surface is configured to divert at least a portion of bubbles passing through the fluid channel to the opening.

In some embodiments, the bubble prevention arrangement further comprises a valve actuatable to release bubbles from the bubble collection region. The valve can be provided in the opening such that the opening can be opened or closed, or it may be provided downstream of the opening in the fluidics connected to the opening, for example in the reservoir, secondary fluid channel and/or vent which are connected to the fluid channel via the opening, where present. The valve may, for example, be used to selectively open the vent, or may itself provide a vent for a reservoir, or may control fluid passage through a secondary fluid channel, for example to control movement of fluid to a waste or outlet. In some embodiments, the valve comprises an actuatable element operable to open and close the valve. The actuatable element can, in embodiments, be formed or comprise an electroactive material which is actuatable under an electrical stimulus to change shapes so as to open and close the valve. Exemplary electroactive materials and valves which can be used in embodiments can be found in "Ionic Electro active Polymer-Based Soft Actuators and Their Applications in Microfluidic Micropumps, Microvalves, and Micromixers: A Review" Annabestani M. and Fardmanesh M arXiv: Applied Physics (2019): 9 Apr. 2019, which is incorporated herein by reference, and "Cilia metasurfaces for electronically programmable microfluidic manipulation" Wang, W., Liu, Q., Tanasijevic, I. et al. Nature 605, 681-686 (2022), which is also incorporated herein by reference.

In other words, the arrangement of the first and second surfaces can be incorporated into any of the other aspects of the disclosure, and advantageously can be synergistically combined with these to further improve bubble management within the system. Any of the embodiments described in respect of the first aspect, such as the properties and configuration of the second surface and/or first surface, apply equally to the embodiments of this aspect. It will be appreciated that these features can be used in conjunction with one another to further reduce interference of bubbles with measurements.

Bypass

In some embodiments, the system further comprises a bypass channel fluidly connected to the fluid channel at a point downstream of the bubble prevention arrangement. This can be downstream of the collecting region, such as downstream of the second surface and the opening, where present. In some embodiments, this is downstream of any additional component selected from any agitation device (and/or the region affected by the agitation device) used in the fluid channel and/or any bubble formation unit (and/or the region affected by the bubble formation unit). The bypass channel may be connected to the fluid channel via a second opening, where the second opening is downstream of the collecting region, such as downstream of the second surface and the opening, where present.

The bypass advantageously allows the sample or analyte of interest to avoid some of the bubble management components which may otherwise interfere with the sample. For example, some sample (e.g. blood) may not be compatible with the bubble management components because they may cause damage (e.g. lysis, coagulation, etc) or may increase the likelihood of other contamination. However, there can still be an advantage in having these as other secondary fluids, such as calibration fluid or washing fluid, may be provided through the sensing assembly for long periods of time and bubbles formed in these fluids may remain on the sensing surface or in the system and interfere with measurement. Accordingly, in these arrangements, the bubble management features may reduce the impact of bubbles in the secondary fluids on the measurement, but the bypass may avoid damage to the sample.

Agitation Device/Bubble Formation Unit

Agitation Device

In the second aspect and in embodiments of the other aspects, the bubble prevention arrangement comprising an agitation device configured to agitate liquid within the fluid channel. This can be so as to (1) cause dissolved gases in the liquid in the fluid channel to form bubbles, wherein the agitation device is arranged so that at least a portion of the formed bubbles can be collected in the bubble collection region; and/or (2) direct one or more bubbles in the liquid to the bubble collection region.

The agitation device can accordingly be used to cause dissolved gases in the fluid to agglomerate/precipitate out as bubbles, at which point these can be captured and retained or dispersed from the system, thereby reducing the dissolved gas content of the fluid and reducing the likelihood of bubble formation at other times or in other regions. That is, it can provide a controlled formation of bubbles in a region where the bubbles can be retained or dispersed. Alternatively or additionally, the agitation device is configured to direct one or more bubbles in the liquid to the bubble collection region. Where the second surface is present, this may direct the one or more bubbles to the second surface. The agitation device can thus impart a force which drives bubbles in a particular direction towards the collection region or, in some cases, cause agitation such that they rise to the top of the fluid channel where they can be retained/dispersed. In some embodiments, the agitation device can provide a pumping action which causes flow of the fluid within the fluid channel to drive one or more bubbles to bubble collection region.

Arrangement of the Agitation Device

The agitation device can be located (partially or entirely) within the fluid channel and/or (partially or entirely) within the system so as to directly contact fluid e.g. on the sensing surface. Alternatively, the agitation device can be located outside the fluid channel and/or may be separated from the fluid e.g. by a wall or membrane. The agitation device can, for example, impart a pulse or force directly or indirectly into the fluid channel or on the sensing surface to cause the abovementioned effects. In some embodiments, the agitation device is arranged to act directly on the fluid contained within the fluid chamber. In other words, the agitation device is arranged to provide a force directly to or act directly on the liquid. Alternatively or additional, the agitation device may be arranged and configured to act on a part of the system, such as the fluid channel or the sensing surface, for example, which in turn acts on the liquid contained therein. For example, the agitation device may vibrate at least a part of the fluid channel, thereby vibrating the fluid therein. In some embodiments, the agitation device may be located adjacent to the opening of the fluid channel. In this way, the agitation device can direct bubbles within the channel and direct them to the opening. Where the agitation device provides a directional force, the agitation device may further be arranged to direct the force towards the bubble collection region, for example via the opening.

In some embodiments, the agitation device is provided so as to act on a part of the fluid channel, for example, in some embodiments the agitation device is arranged upstream of the second surface and/or opposite the second surface. In this way, bubbles formed by the agitation device can be collected by the second surface as they are formed and/or as they move downstream of the agitation device. In additional or alternative embodiments, the bubble collection region is separate to and fluidly connected to the fluid channel via an opening in the fluid channel; and wherein the agitation device is configured to divert at least a portion of bubbles passing through the fluid channel to the opening.

Types of Agitation Device

In some embodiments, wherein the agitation device comprises or is selected from at least one of: a sound-wave generating device configured to cause agitation of the liquid within the fluid channel, a force generating device configured to provide a force to the fluid channel to agitate liquid within the fluid channel; and an actuator comprising a moveable element configured to cause agitation of the liquid within the fluid channel. The force generating device can, in some embodiments, be a sound-wave generating device. In other embodiments, the force generating device can otherwise comprise at least one inductive array, such as at least one inductive coil (e.g. radio frequency inductive coil(s)), configured to generate a force for agitating fluid. The force generating device can cause a pulse of energy which causes movement which can move and detach bubbles from surfaces.

In some embodiments, the agitation device comprises an actuator comprising a moveable element configured to cause agitation of the liquid within the fluid channel (for example, configured to cause movement of the liquid within the fluid channel), wherein the actuator is selected from a piezoelectric actuator, an electroactive polymer actuator and a thermal actuator. A thermal actuator can comprise a thermal device (such as a heating or cooling device) and a moveable element, where the moveable element is configured to change volume or shape in response to a change in thermal energy (for example, it is formed from a thermally modifiable material) and the thermal device (e.g. a heating or cooling element) heats or cools the device. A piezoelectric actuator is one formed or comprising a piezoelectric material and circuitry configured to actuate the piezoelectric material to cause it to change configuration. An electroactive polymer actuator definition is one formed or comprising an electroactive polymer material and circuitry configured to actuate the piezoelectric material to cause it to change configuration. Exemplary materials include those set out in "Ionic Electro active Polymer-Based Soft Actuators and Their Applications in Microfluidic Micropumps, Microvalves, and Micromixers: A Review" Annabestani M. and Fardmanesh M arXiv: Applied Physics (2019): 9 Apr. 2019, which is incorporated herein by reference, and "Cilia metasurfaces for electronically programmable microfluidic manipulation" Wang, W., Liu, Q., Tanasijevic, I. et al. Nature 605, 681-686 (2022), which is also incorporated herein by reference.

In some embodiments, the moveable element is located within the fluid channel or is configured to move a part of the fluid channel so as to cause agitation of the liquid. In further embodiments, the moveable element is a piezoelectric material or electroactive polymer material or comprises an actuator part comprising a piezoelectric material or an electroactive polymer material the actuator part is causing movement of the moveable element. That is, either the piezoelectric material or the electroactive polymer material is the moveable element or a moveable element is moved by the material.

Sound-wave generating devices and some force generating devices can act as remote agitation devices which can advantageously be placed outside the fluid flow pathways, such as the fluid channel and the region on the sensing surface, and can therefore remotely eliminate bubbles from the liquid. For example, coils or certain actuatable materials can be placed within specific layers or regions within the fluid channel walls and/or substrates so that they can be selectively energised/activated as required.

As set out above, in one embodiment, the agitation device comprises a device adapted to agitate the liquid using sound-waves. The use of such devices is particularly advantageous as these provide an agitation means that can directly on the fluid in the sense that it can cause macro-level movement and which can efficiently and effectively agitate the liquid. These can also advantageously be used as directional agitation devices (i.e. devices which provide a force which acts in a particular direction) to create a directional flow within the liquid. A directional force can include a force that primarily travels in a single direction, for example along a single axis, or more generally a force that is not equally dispersed in all directions. For example, such a force may cause fluid to flow in a particular direction (for example, through the use of a sound-focusing or sound-damping housing). In one embodiment, the agitation device comprises an ultrasonic sound-wave generator. Thus, the agitation device in some embodiments is an ultrasonic agitator or probe and the agitation mechanism comprises an ultrasonic transducer, for example a piezoelectric transducer or a capacitive transducer. Second, the application of ultrasonic waves can cause cavitation of the liquid, which produces significant agitation beyond simply that provided by fluid flow and which can be used to generate and disperse bubbles in the liquid flow. This also reduces the likelihood of adherence of bubbles to components of the fluid channel and/or sensing surfaces, particularly since the cavitation can reach areas where flow fails to provide adequate mixing. Thus, in some embodiments, cavitation may be present. This can be introduced, for example by increasing the power provided to or available at the ultrasonic probe and hence the level of vibration. In another embodiment, the ultrasonic agitation device(s) (and/or the control means or unit) may be adapted to avoid cavitation of the fluid, for example by reducing the power. By ultrasonic it is meant that the device generates high-frequency sound-waves which cause vibrations in a fluid, particularly in a liquid. For example, sound-waves with a frequency of greater than 18 kHz, optionally 20-400 kHz and further optionally 40-80 KHz. In an embodiment, the ultrasonic device comprises an ultrasonic transducer or ultrasonic generation mechanism. The ultrasonic transducer or ultrasonic generation mechanism may comprise a piezoelectric element (e.g. an element formed of a piezoelectric crystal), and electrodes connected to a power source and a controller.

In some further embodiments, where an agitation device or bubble formation unit (set out in more detail below) is provided, the agitation device or bubble formation unit may be provided adjacent the opening, and in some cases further embodiments, at least a portion of the agitation device or bubble formation unit may at least partly (in some embodiments completely) surround (e.g. extend around the circumference of) the opening. The second surface and agitation device/bubble formation unit may be provided adjacent one another (e.g. nearby or abutting, such as side-by-side), on different planes, and/or with one stacked on top of the other (e.g. the second surface provided on top of the agitation device/bubble formation unit). In some embodiments, the system may therefore comprise the second surface at least partly (and in some embodiments fully) surrounding the opening and the agitation device/bubble formation unit at least partly (in some embodiments completely) surrounding the opening. These may be formed as two concentric regions, for example, such as two concentric circles. In some embodiments, the second surface forms in the inner concentric region. In one particular embodiment, the agitation device comprises an actuator part comprising a piezoelectric material, an electroactive material, and/or a thermally-actuatable part (as part of a thermal actuator) located in the fluid channel and forming an outer concentric region around the opening, and the second surface forms an inner concentric region around the opening.

In the third aspect and in embodiments of the other aspects, the bubble prevention arrangement arranged adjacent or on the sensing surface and configured to displace one or more bubbles in a region on or adjacent the sensing surface so as to reduce interference of one or more bubbles on the sensing surface. The agitation device may be configured to agitate liquid on the sensing surface so as to displace bubbles from the region on or adjacent the sensing surface. In such embodiments, the agitation device comprises at least one of: a sound-wave generating device, a force generating device configured to provide a force to the sensing surface; and an actuator comprising a moveable element configured to cause agitation of the liquid on the sensing surface. These may have the features set out above. In embodiments using a force generating device, the force generating device can comprise at least one inductive array configured to generate a force for agitating fluid on the sensing surface.

In one alternative or additional embodiment, the agitation device is configured to move the sensing surface so as to agitate fluid on the sensing surface. In such embodiments, the sensing surface may be provided on the agitation device. For example, the agitation device may comprise a piezoelectric material, an electroactive material, an inductive coil (e.g. an inductive radiofrequency coil) or a thermally modifiable material (in the context of the specific, respective agitation devices set out herein) and the sensing surface may be provided on these materials.

In some embodiments, the agitation device is further configured to cause dissolved gases in the liquid on the sensing surface to form bubbles; and wherein the system is configured to remove the formed bubbles from the region on or adjacent the sensing surface. For example, these can be displaced by the agitation device or any other bubble prevention arrangement. Where there is a bubble can be collected in the bubble collection region, these may be moved to bubble collection region.

Bubble Formation Unit

In some embodiments, the system further comprises a bubble formation unit configured to cause dissolved gases in the liquid in the fluid channel to form bubbles, wherein the bubble formation unit is arranged so that bubbles are formed upstream of or at of the bubble prevention arrangement such that the bubble prevention arrangement can prevent at least a portion of the formed bubbles from interfering with the sensing surface.

The bubble formation unit is therefore used to cause bubbles to nucleate or form from the dissolved gases in a preferred region of the device, rather than forming in an uncontrolled manner in another part of the system where they may interfere with the measurement and sensing assembly, by reducing the level of dissolved gas in the liquid. Any bubbles formed can be captured by the bubble prevention arrangement. In embodiments comprising a fluid channel, the bubble formation unit is upstream of or at the bubble prevention arrangement (for example, the second surface) so that the bubbles formed can be retained by the bubble prevention arrangement even as fluid is flowing through the system.

The bubble formation unit may comprise at least one of a thermal unit configured to heat or cool fluid flowing through the fluid channel (e.g. there may be a condenser unit located adjacent or around a part of the fluid channel, such as a Liebig condenser) and a restriction in the fluid channel (such as a venturi tube). Further shaping, topography and dimensions can be used to increase this formation, for example by providing surfaces with nucleation sites and/or by increasing or amplifying any temperature/pressure change caused by the bubble formation unit.

In some embodiments, the system further comprises a bubble formation unit configured to cause dissolved gases in the liquid to form bubbles. The bubble formation unit may be instead of, separate to or part of an agitation device. Both need not be present but in some embodiments both may be present. In some embodiments, the bubble formation unit is or comprises the agitation device. Alternatively or additionally, the agitation device can be used to divert or drive bubbles towards the bubble collection region, for example through the opening. For example, piezo electric material and/or electroactive polymers can be used to drive bubbles towards the opening, where present. This can also be combined with the second surface being configured to divert (e.g. direct) bubbles to the bubble collection region.

The bubble formation unit may comprise at least one surfaces configured to cause dissolved gases in the liquid in the fluid channel to form bubbles thereon. For example, in some embodiments, the at least one surface may have a topology or roughness which causes nucleation of bubbles thereon.

In embodiments, the agitation device(s) and bubble formation unit(s) disclosed herein may be configured to be remotely activated. This might be carried out by having a part of the agitation device/bubble formation unit located within the system (e.g. in or on the fluid channel or sensing element) and the remainder remotely located (e.g. spaced apart from) the part but configured to remotely activate it. In other embodiments, the agitation device may be provided locally within the system (e.g. in or on the fluid channel or sensing element) but a control unit for actuating the agitation device/bubble formation unit is provided remotely and can cause actuation remotely. In these embodiments, an antenna could be provided with the local part, for example, to enable wireless operation. Alternatively or additionally, the actuation could be induced remotely. For example, a piezo element/coil/heating element could be located a specific node/area within a system and activated remotely.

Arranged Adjacent the Sensing Surface

In the third aspect and in embodiments of the other aspects, the bubble prevention arrangement is arranged (or further arranged) adjacent or on the sensing surface and is configured to displace one or more bubbles in a region on or adjacent the sensing surface from the sensing surface so as to reduce interference of bubbles on the sensing surface.

In one embodiment, the bubble prevention arrangement comprises at least one channel with an inlet arranged adjacent or on the sensing assembly. The channel can be provided as an outlet for one or more bubbles from the surface. In some embodiments, the channel is configured to draw bubbles away from the region on or adjacent the sensing surface. The channel can draw bubbles away from the sensing surface using capillary action, for example, such that the at least one channel is arranged and configured such that bubbles located adjacent the inlet are drawn into the channel away from the region on or adjacent the sensing surface using capillary action. Capillary action can be passive or active. That it, is may be a function of the channel shape and surface properties, or the system may be configured to modify the ability of the channel to act as a capillary so that the drawing of the bubbles from the surface can be controlled. This can be through controlling the inlet of the channel, such as opening or closing the inlet.

In one embodiment, the bubble prevention arrangement comprises a plurality of channels arranged on or adjacent the sensing surface and configured to direct fluid across the sensing surface. Such channels can each have an inlet arranged at one side of the sensing surface and an outlet at the other side of the sensing surface. Such an arrangement can serve as a flow smoothing arrangement which reduces turbulence and, therefore, reduces the likelihood of bubble formation. Moreover, bubbles can be routed away from the sensing surface using the channels. For example, in embodiments the channels are each configured to draw bubbles away from the region on or adjacent the sensing surface. The channels can draw bubbles away from the sensing surface using capillary action. In others, they can be used in conjunction with another part of the bubble prevention arrangement for displacing bubbles on the surface. The channels each comprise inlets which can, in some embodiments, be provided on or above the surface such that bubbles on the surface or moving over the surface can be displaced by the channels. In some embodiments, the inlets are configured as a plurality of parallel elongated openings extending across and parallel to at least one plane defined by the sensing surface. In some further embodiments, the bubble prevention arrangement may be provided above the sensing surface with the inlets facing the sensing surface (opening towards) such that bubbles on the surface can rise into the channels and be moved away from the sensing surface. In some embodiments, the channels are configured as a plurality of parallel elongated channels extending across and parallel to at least one plane defined by the sensing surface.

Where a channel or channels are present on or adjacent the sensing surface, the bubbles can be displaced to a bubble collection region or the channels, if configured to retain the bubbles in a position spaced apart form the sensing surface, can act as a bubble collection region. In some embodiments, the system can further comprise a bubble trap, the bubble trap comprising the at least one channel as a trap channel configured to draw a bubble into the trap channel and retain the bubble therein.

Embodiments of the third aspect need not require a fluid channel and, instead, the sensing assembly may have fluid disposed directly on the sensing surface by a user, for example. However, in other embodiments, the system of the third aspect further comprises a fluid channel defining a flow path configured to provide liquid to the sensing surface. The sensing surface can be located in the fluid channel or the fluid channel can comprise an outlet which provides the liquid to the sensing surface. The fluid channel and arrangement of parts relative thereto can be in accordance with any of the other embodiments set out herein. For example, the system may further comprise an agitation device configured to agitate liquid within the fluid channel so as to (1) cause dissolved gases in the liquid in the fluid channel to form bubbles, wherein the agitation device is arranged so that formed bubbles can be collected in the bubble collection region; and/or (2) direct bubbles in the liquid to the second surface. This may be the same agitation device as it used to agitated fluid on the sensing surface, where present. In one embodiment, the agitation device is provided upstream of the second surface and/or opposite the second surface.

Bubble Trap

In embodiment, the system further comprises a bubble trap comprising a trap channel located in the fluid channel and configured to draw at least one bubble into the trap channel and retain the bubble therein. In embodiments where the bubble collection region is arranged on or adjacent the sensing surface, the bubble collection region can comprise a bubble trap comprising a trap channel, wherein the trap channel is configured to draw at least one bubble into the trap channel and retain the bubble therein.

A bubble trap in these embodiments includes a trap channel which can be located in the fluid channel (e.g. upstream of the sensing assembly or adjacent/on the sensing assembly). The trap channel can use capillary action (active or passive) to draw bubbles into the trap channel. The largest diameter of the trap channel is smaller than the largest diameter (or in some embodiments, all diameters) of the fluid channel at least in the region in which the trap channel is located. Hydrodynamic force and surface tension exerted on the bubble to cause the bubble to be drawing into/pushed into the trap channel and then prevent it from escaping.

Pre-Treatment

In some embodiments, the system further comprises a pre-treatment unit arranged to pre-treat liquid so as to reduce the number of bubbles in the liquid and/or to reduce the likelihood of bubble formation. This can be prior to the liquid being provided to the sensing assembly or while the liquid is in the sensing assembly but prior to measurement, for example.

In some embodiments, the pre-treatment unit is configured to apply a vacuum or pressure to the liquid. The pre-treatment unit may be a vacuum degassing or sparging apparatus. Where a fluid channel is present, the pre-treatment may be located upstream of the fluid channel or it may be located along the fluid channel, for example, upstream of the bubble prevention unit.

Gas Scavenger

In some embodiments, the system further comprises a gas scavenger material arranged so as to reduce the volume of one or more bubbles in the liquid. In some embodiments, the system comprises a gas scavenger material provided adjacent or on the sensing surface. For example, in some embodiments, the gas scavenger material may be provided around at least a part of the sensing surface or may be provided in at least one discrete region on the sensing surface. In embodiments comprising a fluid channel in which the sensing surface is located, the gas scavenger material may be located in the fluid channel between the inlet of the fluid channel and the sensing surface.

Gas scavenger materials are used to react with gas-forming molecules in a liquid so as to reduce the concentration of those molecules in the liquid, which in turn causes diffusion of those gases from bubbles into the liquid thereby reducing the size of the bubbles or removing them entirely from the liquid. In some embodiment, the gas scavenger material can be an oxygen scavenger material. In some embodiments, the oxygen scavenger is selected from sodium sulphite ($Na_2SO_3$), sodium dithionite ($Na_2S_2O_4$), ammonium bisulphite ($NH_4HSO_3O_2$), hydrazine ($N_2H_4$) or an oxidase enzyme (e.g. glucose oxidase GOx).

In other embodiments of the methods disclosed herein, the methods may further comprise treating the fluid by providing a gas scavenger to the liquid. For example, gas scavenger can be introduced into the sample prior to measurement. This can be e.g. to a fluid channel upstream of the sensing surface or may be on the sensing surface directly. This can be a pre-treatment.

Sensing Assembly

The method and systems set out herein are for reducing interference by one or more bubbles in a sensing assembly. The sensing assembly comprises a sensing surface (or, in some embodiments, a plurality of sensing surfaces) which is an active surface which can be used to interact with a solution and is addressable or interrogatable to obtain an indication of the interaction of the solution (e.g. an analyte in the solution) with the surface. This can be, for example, an electrode defining the surface, or it could be a sensing layer which is interrogated by electrodes (e.g. a dielectric material, such as in a chemiresistor). In embodiments where the surface is an electrode or a material, the surface can include more than the "bare" surface of these components and can further incorporate additional layers on the active surface. For example, in embodiments where the surface comprises or is defined by an electrode or sensing surface, the electrode or sensing surface may be functionalized or have further layers thereon. In some embodiments, where present, the surface may comprise a functional layer. In some embodiments, this is a capture species configured to specifically bind to an analyte. Thus, the sensing assembly may be configured to determine a property of an analyte in a sample (the solution). Any suitable analyte capture species can be selected according to the target analyte which is intended to be sensed by the sensor assembly. For example, each capture species may comprise an antibody with specificity for a particular antigen. In such an example, the analyte may take the form of the antigen. More generally, each capture species may, in some embodiments, comprise at least one selected from a protein, a peptide, a carbohydrate, aptamer and a nucleic acid. The protein may, for example, be an enzyme, such as an enzyme having specificity for the analyte. In other non-limiting examples, the protein is an antibody. In the latter case, the analyte may be an antigen which is specifically bound by the antibody. Each capture species may, for instance, comprise or be defined by an antigen. In this case, the analyte may be a species, such as an antibody, which is specifically bound by the antigenic capture species. The antigen may be or comprise, for example, a protein, a peptide, a carbohydrate, such as a polysaccharide or glycan. In an embodiment, each capture species is a capture antibody. In an embodiment, each capture species comprises an aptamer. An aptamer may be defined as an oligonucleotide or peptide configured to bind the analyte. Such an aptamer may, for example, be configured to interact with, for example bind, various analyte types, such as small molecules, for example amino acids or amines, proteins, metal ions, and microorganisms. In such cases, the presence of one or more bubbles may interfere with the binding of a capture species with the target analyte and/or may interfere with the deposition of such capture species during manufacture.

The methods, systems and sensor assemblies disclosed herein can be used to determine or measure a property of a liquid sample, such as the temperature, electrical conductivity, a property of an analyte in the liquid sample characteristic. In certain embodiments, this can be selected from the concentration of the analyte in the sample, the diffusion constant of the analyte (e.g. rate of diffusion measured in $m^2/s$) in the sample matrix, or a combination thereof. The terms "analyte concentration" or "concentration of the analyte" as used herein may, in certain embodiments, refer to the activity of the analyte. The activity of the analyte may provide a measure of the effective concentration of the analyte in a sample matrix.

In embodiments, the system may further comprise a control unit configured to: determine a property of the liquid sample based on the measurement signal. In one embodiment, the system may further comprise a signal processing unit configured to process measurement signals received from the sensor assembly (e.g. a sensing layer, or an electrode, where present); and a property determination unit may receive processed signals and determined the property (e.g. the first property, or another property) based on the processed signals. The property determination unit may, in certain embodiments, be configured to determine the property based on (at least) the absolute change in measurement signal and/or the rate of change of the signals. The control unit, property determination unit and/or signal processing unit may each (individually or combined) be a processor or controller. The control unit may incorporate the property determination unit and/or the signal processing unit or may be in addition to one or both of these. The control unit, signal processing unit, and the property determination unit may be implemented in any suitable manner, with software and/or hardware, to perform the various functions required. One or all of the units may, for example, employ one or more microprocessors programmed using software (for example, microcode) to perform the required functions. Examples of processor components that may be employed in various embodiments include, but are not limited to, conventional microprocessors, application specific integrated circuits (ASICs), and field-programmable gate arrays (FPGAS). In various implementations, the control unit, the signal processing unit, and/or property determination unit may be associated with one or more non-transitory storage media such as volatile and non-volatile computer memory such as RAM, PROM, EPROM, and EEPROM. The non-transitory storage media may be encoded with one or more programs that, when executed on one or more processors and/or controllers, perform the required functions. Various storage media may be fixed within a processor or controller or may be transportable, such that the one or more programs stored thereon can be loaded into the signal processing unit, property determination unit and/or control unit. The system may comprise each of these components, where present, in a single device or at a single location, or the control unit and, where present, other components may each individually or as a whole be distributed across a network, such as the internet. The system can also contain antenna, such as RFID structures, such that the sensor outputs can be wirelessly transmitted and/or inputs can be wirelessly transmitted, for example determination of the first property and/or initiation of the removal step can be carried out remotely. For example, wireless activation of electrodes, an agitation device or a force generation device can be used. The system can also be configured such that the data generated is encrypted.

The system may be configured to perform any of the method steps disclosed herein. For example, the control unit may be configured to operate the sensing assembly to perform any of the method steps herein. Moreover, any of the embodiments set out herein with respect to the method apply equally to the system, and any of the embodiments set out herein with respect to the system apply equally to the method.

In the methods and system disclosed herein, the transducer mechanism(s) used to determine the measurement signal(s) may be any suitable method of transduction. For example, this may comprise measuring the potential (e.g. voltage), current, permittivity, charge and/or frequency. Changes in or interactions with a sensing layer (e.g. electrode) can be detected by these means. Where a capture species is present and used for measurement of a property of the solution, this can be interaction of the capture species with an analyte of interest.

The sensing layer (or, where present, separate electrodes) may comprise or be formed from copper, nickel, platinum, silver, silver chloride, gold or other noble metals. In some embodiments, this may comprise or be formed from $TiO_2$ or indium tin oxide (ITO). Other sensing layers may include a substrate with a coating on which the anchor species is immobilized. In other embodiments, the sensing layer may comprise or be formed of carbon (graphene, graphene oxide, or nanotubes), silicon dioxide, aluminum oxide, silicon and/or an electroactive polymer. Sensing layers can provide immobilization of capture species through both covalent-like interactions (e.g. chemisorption of anchor species onto the surface through chemical bond formation) and non-covalent-like interactions (e.g. physisorption of capture species onto the surface through weaker, often van der Waals, interactions) depending on the identity of the surface and the capture species. Provision of capture species or other functionalization to the sensing layer can be achieved through techniques such as spin-coating, physical vapor deposition or electrophoretic deposition, or immersion of the sensing layer in solution.

Certain configurations of the system can help improve bubble management. For example, in some embodiments, the sensing surface may be raised relative to the surrounding surfaces to decrease the likelihood that bubbles can reside on the sensing surface. For example, a sensing layer defining the sensing surface could protrude beyond a substrate surface or the walls of the fluid channel, where located in the fluid channel. In other or additional embodiments the sensing surface could be functionalised to promote wetting (i.e. lower surface energy) to thereby encourage coverage by liquid as opposed to bubbles. In such embodiments, the sensing surface can comprise a hydrophilic coating, such as a self-assembled monolayer (SAM) on the surface to promote or prevent wetting. The liquid can therefore be more attracted to the electrodes than to other areas of the sensing assembly and associated fluidics. In other embodiments, the sensing surface may be subjected to a surface treatment, such as plasma treatment, to promote wetting on the sensing surface.

Other Bubble Management Means

In addition to the above aspects and embodiments, the system may further comprise other bubble management means. For example, in some embodiments, at least one surface (such as the first surface or the second surface) could comprise a self-assembled monolayer (SAM) on the surface to promote or prevent wetting. In other embodiments, the system may comprise a filter located in the system and configured to filter liquid prior to it reaching the sensing surface, the filter being sized so as to prevent bubbles of a particular size from reaching the sensing surface.

First Property Determination

In embodiments of any of the aspects, the system may further be configured to determine a first property of the liquid (e.g. a solution), wherein the first property relates to (i) the presence of one or more bubbles in the fluid channel or in the region on or adjacent the surface of the sensing assembly and/or relates to (ii) a gas in the liquid (e.g. a solution) (e.g. in the fluid channel or in the region on or adjacent the surface of the sensing assembly). The first property is a bubble-related property or parameter in that it relates to the presence of one or more bubbles in the region and/or it relates to a gas (i.e. a gas forming the bubbles, in the form of gas in the form of a bubble and/or dissolved gas in the solution) in the system. This can be used as a count of bubbles to quantitatively determine the number of bubbles present (or present satisfying a particular threshold, for example, size) or can be a property indicative of the presence of bubbles, for example. In some embodiments, the first property relating to a gas can be the measure of a property of the gas in the solution, such as the gas reduction potential or the concentration of dissolved gas(es), and in some cases this can also be an indicator, directly or indirectly, to the presence of the bubbles (but this need not be case). In some cases, this parameter may not provide a direct indication as to the presence of a bubble but may nevertheless be useful in the determination of optimal removal parameters. For example, taking the gas reduction potential, this in turn can be used in an electrochemical reduction to optimally reduce the gas and thereby reduce the bubbles. In other cases, parameters such as concentration of dissolved gases may provide an indication of likelihood of the presence of bubbles and thus be an indirect indicator of bubble presence.

This determination can then be used in the subsequent step of removing the bubbles. This provides a pre-screen of either the presence of bubbles or a parameter related to the bubbles, which is then used as a basis for the subsequent removal. The system can therefore, in embodiments, be configured so as to, based on the determination of the first property, carry out a bubble removal step using the bubble removal arrangement to remove at least a portion of the one or more bubbles from the fluid channel and/or the region on or adjacent the surface of the sensing assembly. Performing this removal step with the first property determined improves the efficiency and effectiveness of the process and reduces sensor assembly down time. It can also improve the accuracy of measurements, as set out below. For example, the first property can provide an indication as to the presence of the one or more bubbles, such that the removal of the one or more bubbles can be dependent on whether the bubbles are actually detected. This can avoid unnecessary operations of a removal process, and thus can be used to reduce sensor downtime and wastage due to running additional or unnecessarily long removal processes. Moreover, the sensor can be responsive to the detection of bubbles, making the process more flexible and responsive as compared to simply running removal steps at intervals or by performing measurements without knowing whether the measurement is being disrupted by bubbles. The first property can additionally or alternatively relate to a gas (i.e. a gas forming the bubbles, in the form of gas in the form of a bubble and/or dissolved gas in the solution) in the solution. This similarly allows the subsequent removal step to be tailored to the gas property. For example, the process used or the properties of the stimulus applied can be modified so that the removal step is more efficient and effective and tailored to the specific bubbles or gas present in the solution. There may also be applications where detecting the presence of or a certain level or threshold of bubbles (e.g. occupying a certain surface area on at least one electrode) is indicative of an important material property or state and important to monitor.

Method

One aspect of the disclosure relates to a method for reducing the interference of bubbles in a system for determining a property of a liquid, the method comprising: providing a system according to any of the aspects or embodiments disclosed herein; providing a liquid to the sensing surface; removing bubbles and/or dissolved gas from the liquid using the bubble prevention arrangement; and determining a property of the liquid using the sensing assembly. The method may use any of the system aspects and embodiments disclosed herein to perform the method steps.

In embodiments where the system uses a fluid channel to provide the fluid channel, the method may therefore comprise providing a liquid to the fluid channel so as to provide fluid to the sensing surface. In embodiment where there is no fluid channel, the liquid may be provided directly to the sensing surface. It will be appreciated that the order of providing the liquid to the sensing surface and removing bubbles and/or dissolved gas from the liquid may not be sequential. For example, it will be possible for the removing bubbles and/or dissolved gas from the liquid step to be carried out during the provision of the liquid to the sensing surface (e.g. as it is moving through the system to the sensing surface).

In embodiment where there is a second surface, the method may comprise retaining bubbles on the second surface of the bubble prevention arrangement and/or diverting at least a portion of bubbles in the liquid to the opening.

In embodiments where the system comprises an agitation device, the method may comprise (1) actuating the agitation device to cause dissolved gases in the liquid in the fluid channel to form bubbles and collecting/retaining the bubbles in the bubble collection region and/or (2) actuating the agitation device to direct bubbles in the liquid to the bubble collection region.

In an embodiment, the step of providing a liquid comprises providing at least one of a liquid sample and a liquid calibration solution.

In an embodiment, the method further comprises providing a surfactant or solvent to the sensing assembly providing the liquid to the sensing assembly. In another embodiment, the system comprises a fluid channel defining a flow path configured to provide liquid to the sensing surface; and wherein: the step of providing liquid to the sensing surface comprises providing a liquid to the fluid channel so as to provide fluid to the sensing surface; and the method further comprises providing a surfactant or solvent to the fluid channel prior to providing the liquid to the fluid channel. Flushing with a surfactant can decrease the likelihood of bubble formation on surfaces where the surfactant remains. This is achieved by changing the surface energy (e.g. making the surface more or less hydrophobic). Washing with a solvent can remove contaminants (reducing the risk of bubble formation) and prepare the surface for the introduction of fluid. For example, use of surfactants and solvents, which have a lower wetting angle, can remove stuck bubbles more easily and can coated with hydrophilic coating to decrease the number of bubbles sticking to unwanted surfaces.

In one embodiment, the method further comprises pre-treating the liquid prior to determining a property of the liquid so as to reduce the number of bubbles in the liquid and/or to reduce the likelihood of bubble formation prior to the liquid being provided to the sensing assembly. This can be prior to the liquid being provided to the sensing assembly or while the liquid is in the sensing assembly but prior to measurement, for example. The pre-treatment can be carried out using any of the devices or techniques set out above for pre-treatment in the system. For example, in embodiments, the step of pre-treating comprises at least one of applying a vacuum to the liquid, applying pressure to the liquid, and/or providing a gas scavenger to the liquid.

In one embodiment, the method further comprises determining a first property relating to the number of bubbles in the liquid. This can be as set out above in respect of the system. In some embodiments, the step of removing bubbles and/or dissolved gas from the liquid using the bubble prevention arrangement is carried out based on the determined first property.

In one embodiment, the liquid is charged and the method further comprises applying an opposing charge to the sensing surface so as to cause the liquid to cover the sensing surface. In other words, a charge can be applied the sensing surface (this may be using a sensing layer (e.g. an electrode defining the sensing surface)) so as to promote coverage of the surface with the liquid.

In some embodiments, the liquid is provided to the sensing assembly in an environment having an oxygen content of at least 95% and wherein the step of removing bubbles and/or dissolved gas from the liquid comprises removing oxygen and/or dissolved oxygen from the liquid.

Definitions

"Bubble" as set out herein is the pocket or void of gas formed in the sample. The bubble comprises at least one gas, by which it is meant the void is filled with the gas, and is typically predominantly one gas in these environments. By "gas", it is meant a gas forming the one or more bubbles and can be in the form of the gas in the bubble (i.e. the first property relates to a measurement of a property or parameter of the gas in the bubble(s)) or it can relate to that gas in the form of the molecules forming the gas when in the solution (e.g. as a dissolved gas). In other words, the one or more bubbles are comprised of or consist of a gas, and the first property relates to the gas. For example, where the one or more bubbles in such a system are typically formed of or comprise oxygen, the measurement of the first property can relate to oxygen in the solution in the form of dissolved oxygen or oxygen in the bubble. Exemplary gases in embodiments can be selected from at least one of oxygen, carbon dioxide, and nitrogen. In the case of oxygen, this accordingly relates to oxygen, or a property of oxygen, in the solution on or adjacent the surface of the sensing assembly. In some embodiments, the bubble has a volume % content of at least 50% of the gas in question, such as at least 75 vol %.

By "region on or adjacent a surface" it is meant that the one or more bubbles is located at least partially on the surface with the wall of the bubble in contact with the surface to the extent that the bubble rests or otherwise adheres to the surface (e.g. through electrostatic or other interactions) or that the bubble is next to and sufficiently close to the surface such that it can interfere with a measurement or interaction with the surface. This may be within a region defined perpendicular to a part of the surface defining a plane, such as directly above. For example, adjacent may in some embodiments, mean within 1 micrometre of the surface, such as within 500 nm, such as within 250 nm, such as within 100 nm, such as within 50 nm (in any direction, or directly above in some embodiments). Many measurements rely on interactions at these distances, particularly within 100 nm (where capture species can be of the order of 10-100 nm) and Debye lengths can be of the order of 1-10 nm. Bubbles within these regions can interfere. In the case of electrochemical removal, the bubbles are at least partially on the surface (i.e. in contact with).

"Liquid" as used herein has its usual meaning and encompasses solutions, such as those having a liquid component into which solutes are provided or other components are suspended. A solution may be a liquid together with a bubble and/or dissolved gas or may contain a further solute.

Specific Embodiments

FIG. 1 schematically depicts a system 100 for determining a property of a liquid. The system 100 comprises a fluid channel 145 and a sensing assembly 105 located within the fluid channel 145. FIG. 2 schematically depicts a cross-section view of the fluid channel 145 with the sensing assembly 105 located therein.

As depicted in FIG. 1, the system 100 comprises the sensing assembly 105 and a processing unit 150 which acts as a control unit for the device and a signal processing unit for processing measurement signals received from the sensing assembly 105. The system 100 also comprises a fluid channel 145 extending from an inlet 145A to an outlet 145B. The sensing assembly 105 is located in the fluid channel 145 such that sample can be provided to the sensing assembly 105 via the fluid channel 145.

The sensing assembly 105 comprises a sensing layer in the form of an electrode 110, which acts as a working electrode, the upper surface of which is exposed to liquid in the fluid channel 145 and which defines a sensing surface 115. The electrode 110 is connected to the control unit 150 via a trace 112. A second electrode (not shown) can be located elsewhere and acts as a counter electrode. A reference electrode can also be used, but not depicted. In use, a liquid sample can be provided to the fluid channel 145 at the inlet 145A so that it flows along the fluid channel to the electrode 110, where it is interrogated by the electrode 110 to obtain a measurement signal, which can be used to determine a property of the sample. In this embodiment, the measurement signal is relayed to the control unit, which will then determine a property of the sample.

Figures 3, 4A, 4B, 4C:
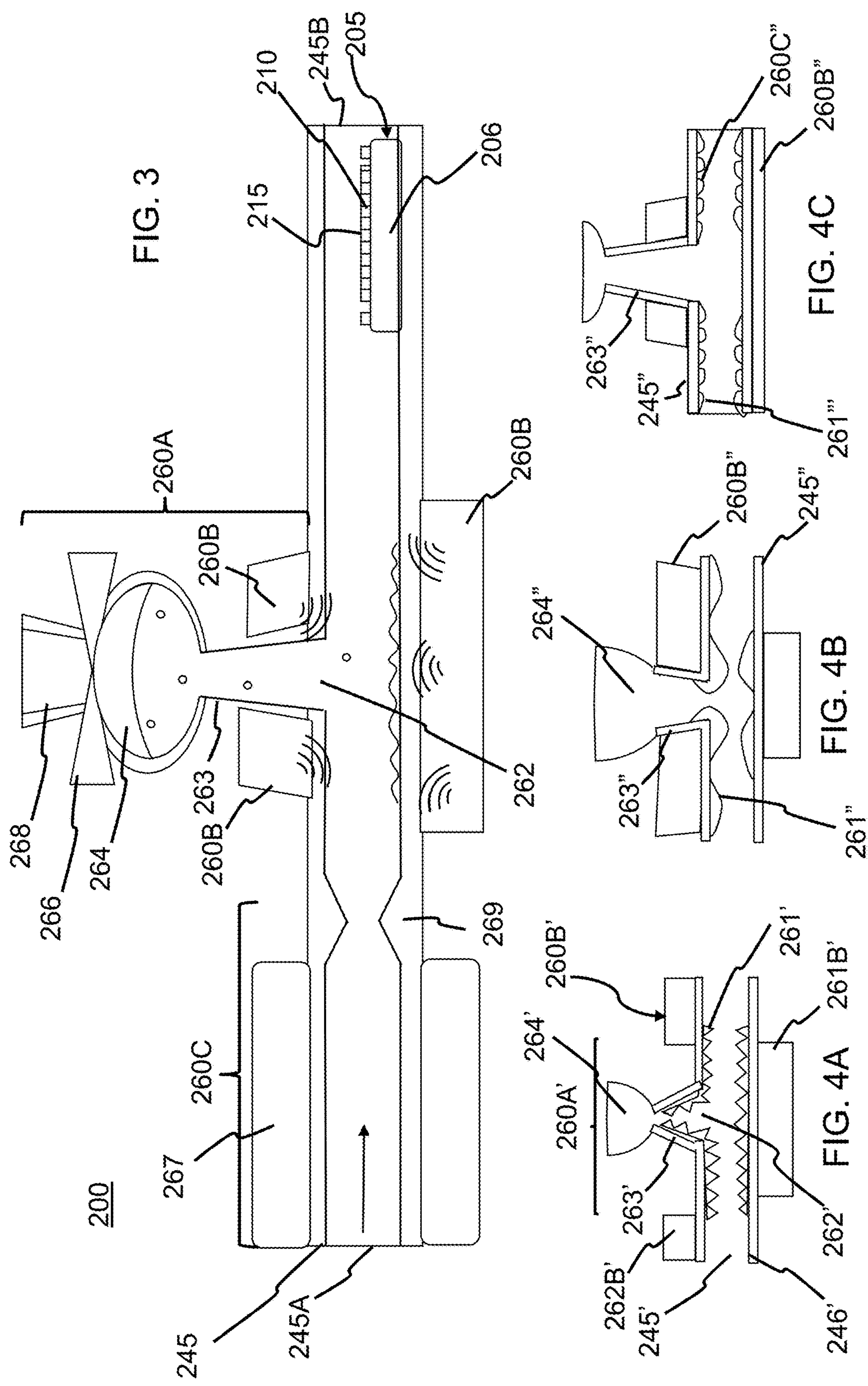
FIG. 3 provides a schematic cross-sectional view of a system according to an embodiment.
FIGS. 4A to 4C provide schematic cross-sectional view of parts of systems according to embodiments.

In system 100, bubbles 1 can form within the fluid channel 145, including on the sensing surface 115. Of particular concern in systems such as the system 100 of FIGS. 1 and 2 are either in the fluid channel 145 upstream of the sensing surface 115 or in a region on or above the sensing surface 115, since these bubbles 1 pose the greatest risk of interfering with the measurement of a property. The sensing surface 115 can be prone to bubble formation (for example, because it is difficult to treat the surfaces to reduce bubble formation as compared to the inner surfaces of a fluid channel such as fluid channel 145) and bubble formation on such surfaces can be particularly problematic (as compared to elsewhere) as bubbles can directly interfere with the measurement process. As can be seen in FIGS. 2 and 3, the sensing surface 115 (i.e. the upper surface of electrode 110) has a bubble 1 formed directly on it and another bubble located adjacent the surface (in this case, directly above). The bubble 1 formed directly on the sensing surface 115 reduces the surface area of the electrode 110 available for measurement, disrupting any quantitative accuracy and reducing performance. The bubble 1 not in direct contact but located above the sensing surface 115 may still have an impact on measurement, for example by reducing the amount of sample availability. Bubbles upstream are also likely to impede sample passage and/or move downstream to the sensing surface 115, thus posing a problem.

Embodiments of the disclosure will now be set out with reference to the system 100 set out above with reference to FIGS. 1 and 2. These embodiments set out systems configured to reduce interference of measurement by one or more bubbles and methods for reducing interference of measurement by one or more bubbles.

FIG. 3 depicts a cross-sectional side view of a system 200 having the same basic structure as the system 100 depicted in FIGS. 1 and 2. Specifically, system 200 is for determining a property of a liquid sample and comprises a fluid channel 245 extending from an inlet 245A to an outlet 245B and in which there is located a sensing assembly 205. The sensing assembly 205 is provided adjacent the outlet 245B of the fluid channel 245. The sensing assembly 205 comprises a substrate 206 on which is provided a sensing layer in the form of an electrode 210, which acts as a working electrode, the upper surface of which is exposed to liquid in the fluid channel 245 and which defines a sensing surface 215. The remainder of the sensing assembly and system, for example with respect to the presence of a control unit, can be in accordance with the system 100 of FIGS. 1 and 2.

The system is further configured reduce reducing interference by one or more bubbles on the measurements and the sensing assembly in that the system further comprises a plurality of bubble prevention arrangements 260A-260C which act to reduce or prevent the passage of bubbles to the sensing assembly 205 and/or reduce the risk of bubbles forming on the sensing assembly 205, as will be set out in more detail below.

The first bubble prevention arrangement in this embodiment is a bubble formation unit 260C located adjacent the inlet 245A of the fluid channel 245 and comprises a thermal unit 267 which surrounds the fluid channel 245 together with a restriction 269 in the fluid channel 245. The thermal unit 267 is configured to heat and/or cool liquid flowing through the fluid channel so as to provide a control over bubble formation. For example, the change in temperature can be used to control bubble formation (e.g. suppress or encourage bubble formation) and/or control the size. Encouraging bubble formation can be useful where the objective is to reduce the concentration of dissolved gases in the liquid and capture these bubbles. This reduces the likelihood of bubble formation further downstream. The restriction 269, which provides a smaller cross-section of flow path compared to the remainder of the fluid channel 245, has a similar effect. In this embodiment, these both are configured to encourage formation of bubbles, which are then subsequently trapped downstream.

Downstream of the first bubble prevention arrangement are the second bubble prevention arrangement and the third bubble prevention arrangement.

The third bubble prevention arrangement comprises a bubble collection region 260A which is fluidly connected to the fluid channel 245 by an opening 262 in the fluid channel upper wall. The bubble collection region comprises a secondary fluid channel 263, a reservoir 264, a valve 266 and a vent 268. The secondary fluid channel 263 connects the opening 262 to the reservoir 264. In FIG. 3, the reservoir 264 comprises a gas-liquid interface and so bubbles will rise to the surface of the liquid and be dispersed. Alternatively, the reservoir 264 may be full of liquid, in which case bubbles may be retained within the liquid in the reservoir 264. In both cases, the bubbles are prevented from moving downstream to the sensing assembly 205. At the top of the reservoir 264 is a vent 268 which is sealed by a valve 266. The valve 266 can be open and close to vent liquid and/or bubbles from the reservoir 264.

The second bubble prevention arrangement is in the form of an agitation device 260B provided around the circumference of the fluid channel 245 at the third bubble prevention arrangement. Specifically, the agitation device 260B surrounds the secondary fluid channel 263.

The agitation device 260B in this embodiment is an ultrasonic agitation device and is configured to agitate liquid within the fluid channel 245 so as to (i) cause dissolved gases in the liquid in the fluid channel to form bubbles and (ii) direct one or more bubbles in the liquid to the bubble collection region, and more specifically through opening 262. In particular, the agitation device 260B is arranged so that ultrasonic waves are provided to the interior of the fluid channel 245 which causes cavitation and bubble formation, while the directional nature of the ultrasonic waves drives the bubbles towards the opening 262 and into the bubble collection region, where they are retained and prevented from moving downstream. Similarly, bubbles formed using the third bubble prevention arrangement 260A will be driven through the opening by the agitation device 260B. (It will be appreciated that, in additional or alternative embodiments, agitation device 260B can be electrically activated and could be a piezoelectric material, inductive coils, an electroactive polymer or some other suitable construction (as set out elsewhere herein) depending on the specifics of the application).

Accordingly the three bubble prevention arrangements 260A-260C work together to reduce the possibility of interference of bubbles on the downstream sensing assembly 205.

FIGS. 4A to 4C depict cross-sectional side views of further fluid channels 245'-245" which can be used in the system 200 in other embodiments, for example, replacing the second and third bubble prevention arrangements.

FIG. 4A depicts a fluid channel 245' in which there is provided first and second bubble prevention arrangements 260A', 260B'. The fluid channel 245 comprises an inner surface 246' which has a first surface texture, in this embodiment which is smooth and without any raised surface topography. The first bubble prevention arrangement 260A' in this embodiment comprises a second surface 261' at least partly located in the fluid channel 245' which has a second surface texture in which there are raised profiles located along the surface. This second surface 261' texture provides a surface which has a higher affinity for bubbles relative to the inner surface 246' and therefore can catch bubbles to retain thereon, forming a part of a bubble collection region. The first bubble prevention arrangement 260A' further comprises a further bubble collection region formed of a secondary fluid channel 263', which is connected to the fluid channel 245' via an opening in the fluid channel 245, and a reservoir 264 is connected to the secondary fluid channel 263'. The reservoir 264' can retain bubbles therein.

In this embodiment, the second surface 261' also extends into the secondary fluid channel 263' to encourage bubbles to move through the opening 262'. Additionally, the secondary fluid channel 263' is tapered so as to reduce in diameter from the opening 262' to the reservoir 264'.

This embodiment further comprises a second bubble prevent arrangement 260B' which comprises an agitation device. In this case, the agitation device comprises a first agitation element 261B' located directly opposite the opening 262' which serves to cause bubble formation and drive bubbles to the opening 262' and second plural agitation elements 262B' spaced upstream and downstream of the opening 262' and the first agitation element 261B'. The agitation device 260B can also be used to drive bubbles caught and formed on the second surface 261' through the opening 262' to disperse them from the fluid channel 245'.

In the embodiment of FIG. 4A, the raised profiles of the second surface 261' taper to a point, which can encourage bubble formation. It will be appreciated that the location, shape, topography, size and construction of the second surface 261' can be modified and constructed depending on the specific requirements of the application. In other embodiments, the second surface 261' may have a raised, but rounded profile, such as that depicted in the fluid channel 245" of FIG. 4B.

FIG. 4B has the same basic structure as the embodiment of FIG. 4A. FIG. 4B, however, also differs from the embodiment of FIG. 4A in that the secondary fluid channel 263" tapers outwardly from the opening in the fluid channel 245" to the reservoir 264" and in that the agitation device 260B directly surrounds the secondary fluid channel 263" and opening.

FIG. 4C has the same basic structure as the embodiment of FIG. 4A. FIG. 4C, however, differs from the embodiment of FIG. 4A in that the second surface 261'" does not extend into the secondary fluid channel 263'" and instead remains only in the fluid channel 245'". Moreover, the second surface 261'" in this embodiment is a functional coating configured to alter the affinity of the second surface 261'" to bubbles relative to the first surface (not shown).

Figures 4D, 5A, 5B, 5C:
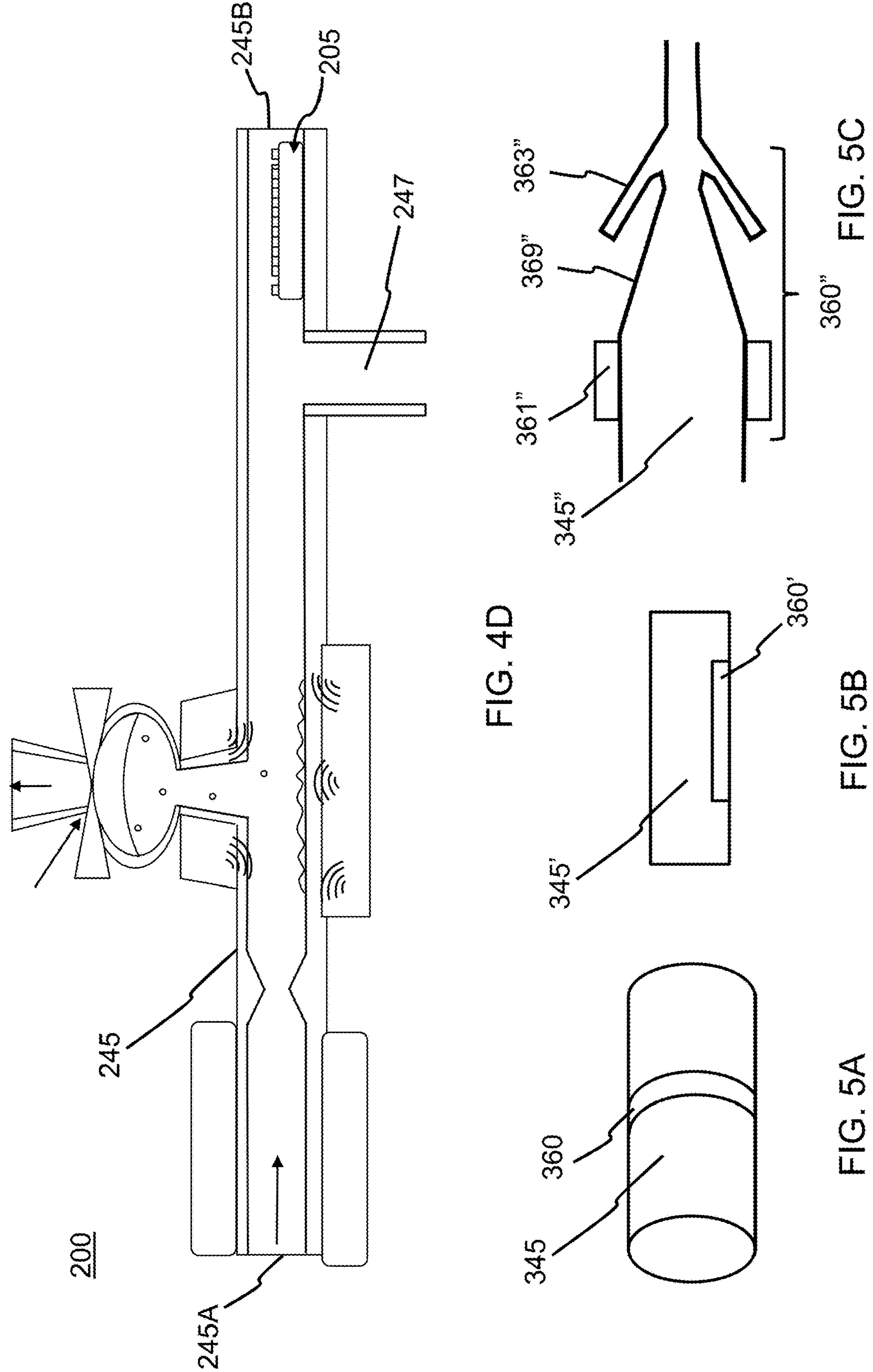
FIG. 4D provides a schematic cross-sectional view of a system according to an embodiment.
FIG. 5A to 5C provide schematic cross-sectional view of parts of systems according to embodiments.

FIG. 4D a further modification of the embodiment of FIG. 3. In particular, the system 200 depicted in FIG. 4D is the same as that of FIG. 3, with the exception that there is an additional fluid channel in the form of a bypass channel 247 which is fluidly connected to the fluid channel 245 at a point downstream of the first to third bubble prevention arrangements 260A-260C. The bypass advantageously allows the sample or analyte of interest to avoid some of the bubble management components which may otherwise interfere with the sample. For example, some sample (e.g. blood) may not be compatible with the bubble management components because they may cause damage (e.g. lysis, coagulation, etc) or may increase the likelihood of other contamination. However, there can still be an advantage in having these as other secondary fluids, such as calibration fluid or washing fluid, may be provided through the sensing assembly 205 for long periods of time and bubbles formed in these fluids may remain on the sensing surface or in the system and interfere with measurement.

FIGS. 5A to 5C provide further modifications which can be used in the systems 100, 200 of FIGS. 1 to 4D or any other system set out herein.

FIG. 5A provides a perspective view of a fluid channel 345 in isolation, which fluid channel 345 could be used in any of the embodiments set out herein. In this embodiment, a bubble prevention arrangement in the form of an agitation device 360 is provided around the circumference of the fluid channel 345 so as to provide agitation of the fluid across the whole fluid channel width. Such an agitation device 360 configuration is useful when forming bubbles in the fluid channel using the agitation device 360. It will be appreciated that, in other embodiments, the size, shape and specific location of agitation device 360 can be implemented depending on the specific requirements of the application where the intent is to agitate the fluid/channel in a specific region (where other features may be located nearby-such as bubble entrapment regions/release valves/vents etc. which are not shown here).

FIG. 5B provides a cross-sectional side view of a fluid channel 345' in isolation. In this embodiment, the bubble prevention arrangement 360' is provided on one side (surface) of the fluid channel rather than extending around the entire circumference. This is useful for imparting direction on the bubbles. Moreover, in this embodiment, the bubble prevention arrangement 360' is located within the fluid channel 345 and is provided on one of the fluid channel surfaces.

FIG. 5C provides a cross-sectional plan view of a fluid channel 345" in isolation. This fluid channel 345" incorporates a bubble prevention arrangement 360" comprising three separate parts. The first part is an agitation device 361" to pass located on opposing sides of the fluid channel 345" and configured to agitate fluid passing through the fluid channel 345". The fluid channel 345" is also provided with a restriction 369" where the diameter of the fluid channel 345" narrows from a first diameter to a narrower second diameter, in this embodiment across a taper. Finally, vents 363" are provided for venting any bubbles in the liquid passing through the fluid channel 345" from the system. It will be appreciated that the specific dimensions, shape and size of 345' and the relative taper and size/location of 363' can be modified depending on the specific application.

FIGS. 6A to 6D provide further examples of fluid channels 445-445''''' and bubble prevention arrangements which can be used in the systems 100, 200 of FIGS. 1 to 4D or any other system set out herein. FIGS. 6A to 6D each show a cross-section through a fluid channel 445-445''''' to show the structures which can be formed therein to provide a bubble prevention arrangement.

Figures 6A, 6B, 6C, 6D:
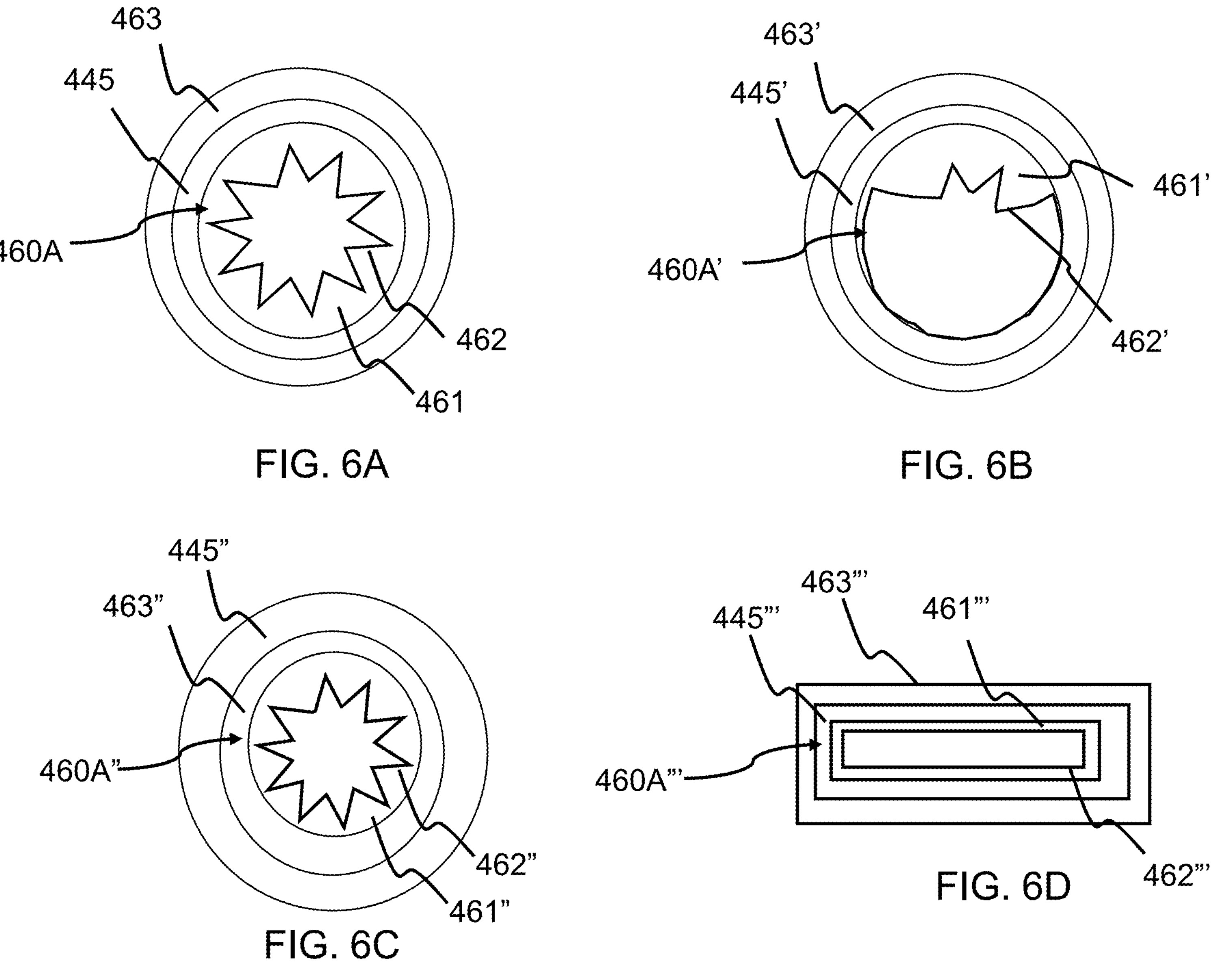
FIG. 6A to 6D provides a schematic cross-sectional view of fluid channels and bubble prevention arrangements forming part of systems according to embodiments.

FIG. 6A depicts an arrangement having, from the outer surface moving radially inwardly: an electroactive or piezoelectric material 463, for example, forming an actuator of an agitation device; a sidewall of the fluid channel 445; a bubble prevention arrangement 460A formed of a second surface 461 having a particular topography and a hydrophilic coating 462.

FIG. 6B depicts an arrangement having, from the outer surface moving radially inwardly: an electroactive or piezoelectric material 463', for example, forming an actuator of an agitation device; a sidewall of the fluid channel 445'; a bubble prevention arrangement 460A' formed of a second surface 461' having a particular topography and a hydrophilic coating 462'. In this case, the topography is only on the upper portion of the fluid channel 445'. In FIG. 6B the bubbles formed in the application may (for example) predominantly appear on the top of the fluid and hence locating 462' on the upper portion of the channel (which may come in contact with the upper layer of the fluid flowing through the channel) might be desirable.

FIG. 6C depicts an arrangement having, from the outer surface moving radially inwardly: a sidewall of the fluid channel 445"; an electroactive or piezoelectric material 463", for example, forming an actuator of an agitation device; a bubble prevention arrangement 460A" formed of a second surface 461" having a particular topography and a hydrophilic coating 462".

Each of FIGS. 6A-6C depict circular fluid channels 445, 445', 445" with circular cross-sections, but other cross-sections are possible. FIG. 6D depicts a fluid channel 445''' with a rectangular cross-section and having from the outer surface moving inwardly: an electroactive or piezoelectric material 463''', for example, forming an actuator of an agitation device; a sidewall of the fluid channel 445'''; a bubble prevention arrangement 460A''' formed of a second surface 461''' having a particular topography and a hydrophilic coating 462'''.

Figures 7A, 7B, 7C, 7D, 7E, 7F:
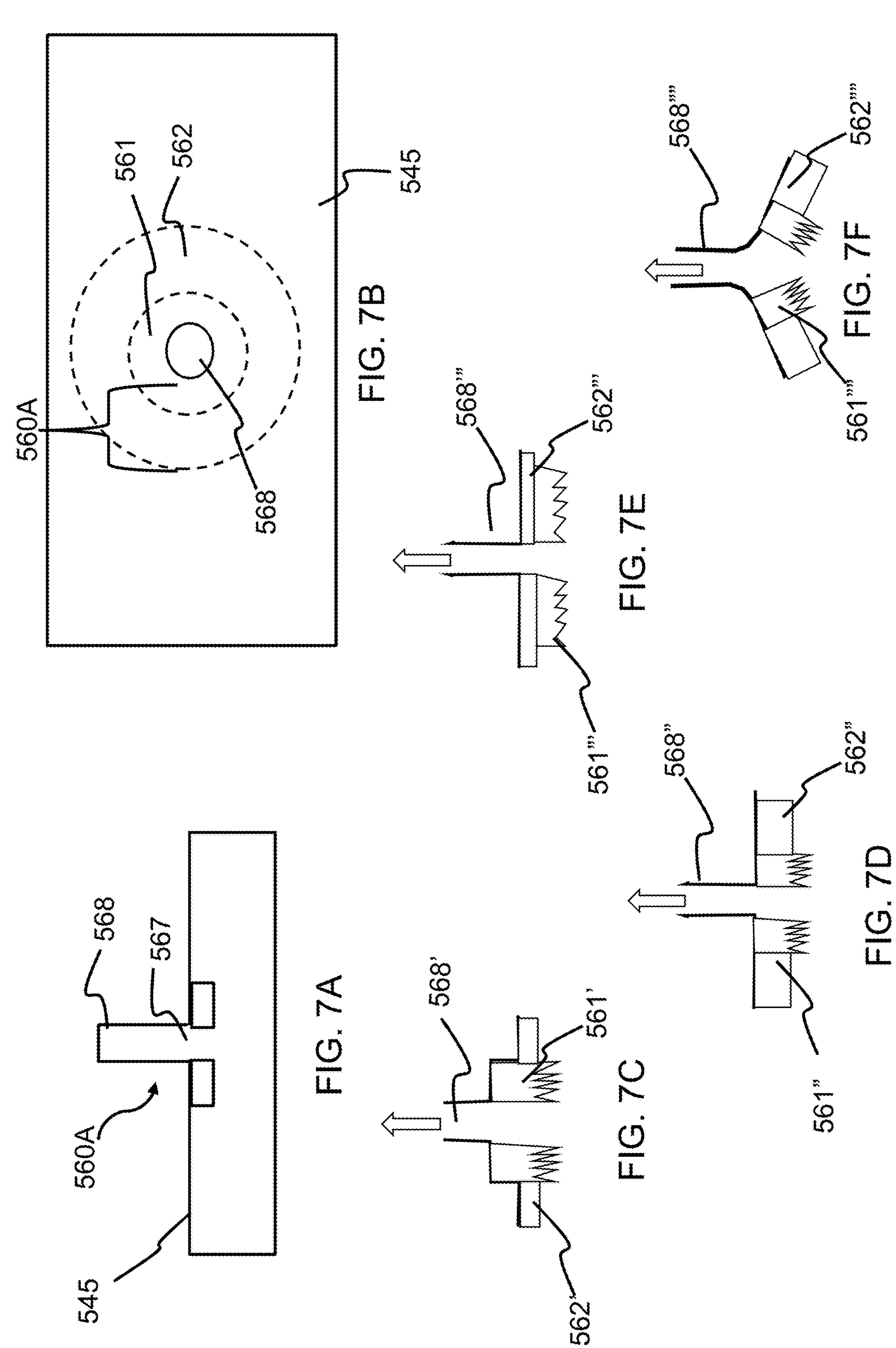
FIG. 7A provides a schematic cross-sectional view of a part of a system according to an embodiment.
FIG. 7B provides a schematic plan view of a part of a system according to an embodiment.
FIG. 7C to 7F provide schematic cross-sectional views of parts of systems according to embodiments.

FIG. 7A depicts a cross-section side view of an example fluid channel 545 and bubble prevention arrangements 560A, 560B which can be used in systems according to embodiments. FIG. 7B shows a plan view of the fluid channel 545 and a bubble prevention arrangement 560A. In this embodiment, there is a first bubble prevention arrangement 560B comprising a vent 568 which is connected to the fluid channel 545 via an opening 567 in the upper surface. Bubbles can be removed from the fluid channel 545 via the vent 568. The bubble prevent arrangement 560A also comprises two additional components: a first material arranged circumferentially about the opening 567, the first material providing a second surface 561 which in this embodiment can have an affinity to bubbles that is higher than the remainder of the fluid channel 545 inner surface and/or diverts bubbles towards the opening, and a second material arranged circumferentially about the opening 567, forming an actuator part 562 of an agitation device or a heating unit.

Various configurations of this arrangement are depicted in the cross-sectional side views of FIGS. 7C to 7F. In each of these examples, the second surface 561'-561'''' includes surface texturing to increase the surface area.

FIG. 7C depicts an arrangement where the second surface 561' is arranged circumferentially about the opening leading to vent 568' and the actuator part 562' is arranged circumferentially around the second surface 561'. In this particular embodiment, the materials forming the second surface 561' and the actuator part 562' are arranged on different planes. That is, the surface on which the materials are formed are in different planes. This can account for differences in depth of these materials.

FIG. 7D depicts an arrangement where the second surface 561" is arranged circumferentially about the opening leading to vent 568" and the actuator part 562" is arranged circumferentially around the second surface 561". In this particular embodiment, the materials forming the second surface 561" and the actuator part 562" are co-planar. That is, the surface on which the materials are formed are located is in a single plane.

FIG. 7E depicts an arrangement where the actuator part 562''' is arranged circumferentially around the second surface 561''' and the second surface 561''' is provided on top of the actuator part 562" and also arranged circumferentially about the opening leading to vent 568'''. In this way, there can be direct agitation or heating/cooling of the second surface 561'''. In this embodiment, the actuator part 562" extends beyond the ends of the outer circumference of the second surface 561''', but this may not be necessary in other embodiments.

FIG. 7F depicts an arrangement where the second surface 561'''' is arranged circumferentially about the opening leading to vent 568'''' and the actuator part 562'''' is arranged circumferentially around the second surface 561''''. In this particular embodiment, as with FIG. 7D, the second surface 561'''' and the actuator part 562'''' are formed on a surface having a single plane. However, in this embodiment, the surface is tapered towards the vent 568'''' (that is, both the opening and vent are tapered) such that the second surface 561"" can guide bubbles to the opening.

Figures 8, 9A, 9B:
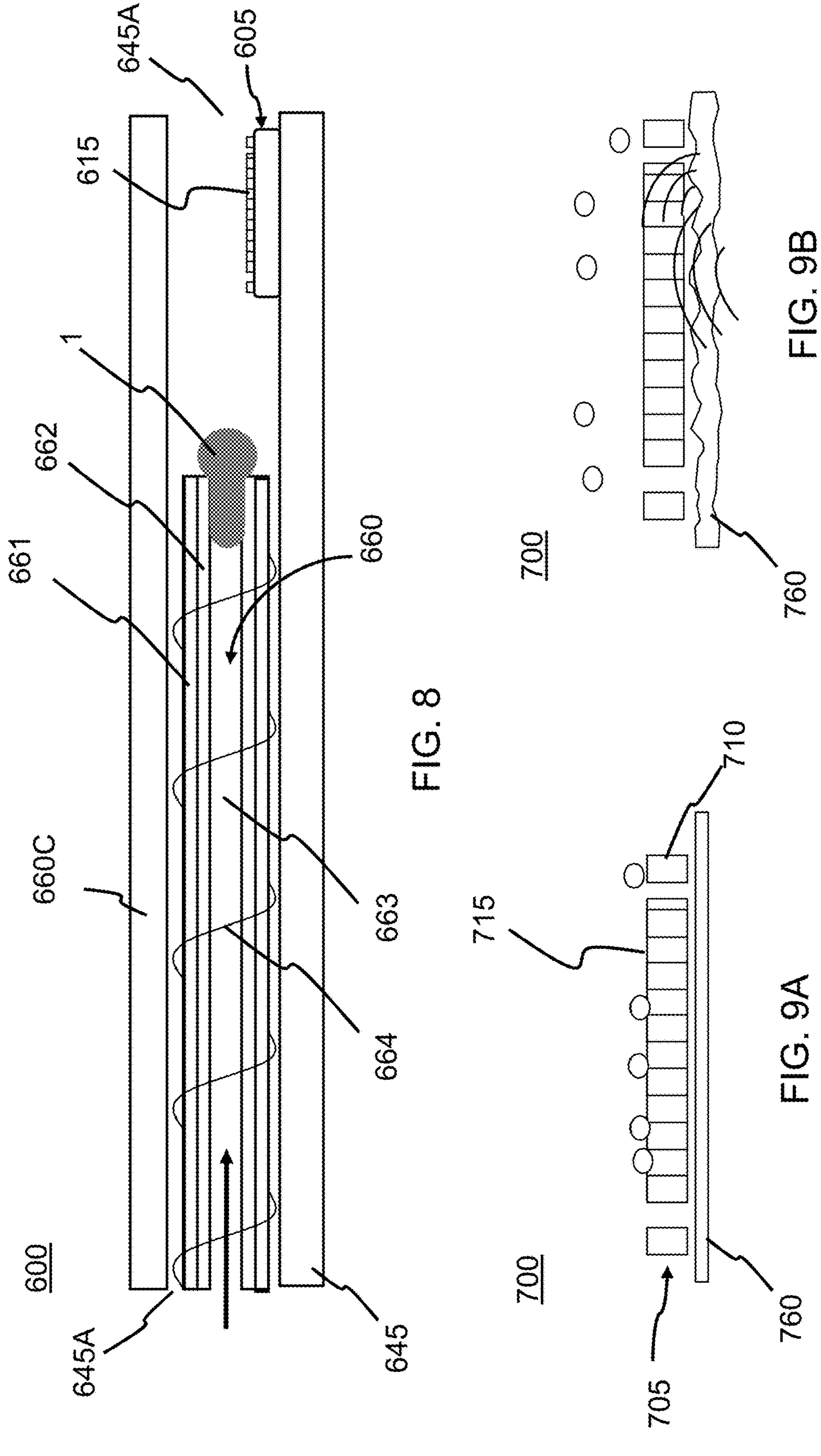
FIG. 8 provides a schematic cross-sectional view of a system according to an embodiment.
FIGS. 9A and 9B provide schematic cross-sectional views of systems according to embodiments.

FIG. 8 depicts a cross-section side view of a system 600 for determining a property of a liquid according to an embodiment. The system 600 comprises a fluid channel 645 and a sensing assembly 605 defining a sensing surface 615 located within the fluid channel 645 such that sample can be provided to the sensing assembly 605 via the fluid channel 645. As depicted in FIG. 8, the fluid channel 645 extends from an inlet 645A to an outlet 645B.

System 600 further comprises a bubble prevention arrangement in the form of a bubble trap 660. The bubble trap 660 comprises a trap channel 663 configured to draw a bubble 1 into the trap channel 663 and retain the bubble therein, as depicted. Specifically, the trap channel 663 comprises a channel wall 661 which is coated on its inner surface with a coating provided to trap the channel. The bubble trap 660 works by combining hydrodynamic force and surface tension exerted on the bubble to push the bubble into the trap channel 663 and prevent it from leaving the trap channel 663. The channel could be fabricated from materials including glass, silicon, polydimethylsiloxane (PDMS), ceramic, Polymers, silicone, membranes, semi-permeable membranes, composites, laminates or any other suitable materials (including those already referenced in this document), The construction dimensions, stack, size and shape can be modified and optimized depending on the requirements of the application.

In this embodiment, the bubble trap 660 further comprises a spacer 664 (in this embodiment in the form of a metal spiral) around the outside of the trap channel 663 to ensure there is space kept between trap channel 663 and the fluid channel 645 to allow for flow outside of the trap tube. Of course, in other embodiments, this can be omitted.

In a further embodiment, an actuator part of an agitation device (e.g. a piezoelectric or electroactive material) could be incorporated into the bubble trap 660 (e.g. in or on the trap channel 663) to remove bubbles from unwanted surfaces or to help in guiding the bubbles into the trap channel 663.

Although depicted in the fluid channel and spaced from the sensing surface 615, it will appreciated that such a trap could be located with an inlet adjacent or on the sensing surface 615 so as to draw bubbles from the sensing surface 615. Additionally or alternatively, this could be combined with any of the other bubble removal arrangements.

In some methods using this system 600, methods could comprise rinsed the fluid channel 645 (but not the internal part of the trap channel 663) with a solvent (e.g. ethanol) prior to use to lower the wetting angle of the fluid channel surfaces and to remove any stuck bubbles in corners or areas of the sensor or coated with hydrophilic coating to decrease the number of bubbles sticking to unwanted surfaces.

FIGS. 9A and 9B provide schematic side views of a system 700 comprising a sensing assembly 705, the sensing assembly comprising a sensing layer 710 defining a sensing surface 715. The sensing surface 715 is configured to receive a liquid sample. The sensing assembly is configured to provide a measurement signal indicative of an interaction of the sensing surface 715 with the liquid.

The system 700 further comprises a bubble prevention arrangement arranged adjacent the sensing surface 715 and configured to displace one or more bubbles on the sensing surface 715 so as to reduce interference of one or more bubbles on the sensing surface 715 (i.e. reduce interference with measurement of liquid on the sensing surface). In this embodiment, the bubble prevention arrangement comprises an agitation device 760 located beneath the sensing layer 710 (the sensing layer 710 is formed on top of a material forming an actuator part of the agitation device) such that actuation of the agitation device 760 can cause a force to act directly on the bubbles on the sensing surface 715. Depending on the specific implementation of the agitation device 760, this can result in movement of the sensing surface 715 as well or may just displace bubbles from the sensing surface 715.

Figure 10A:
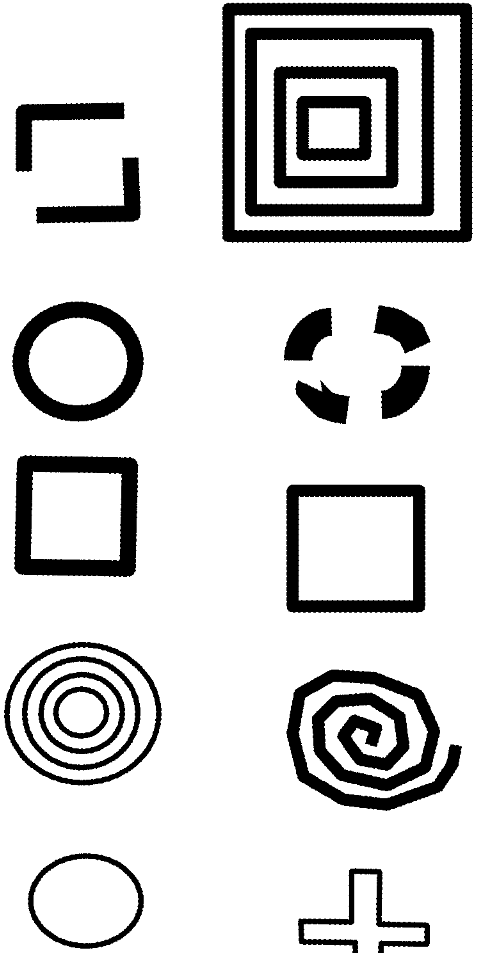
FIGS. 10A and 10B provide exemplary inductive element structures.
Figure 10B:
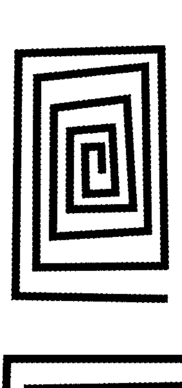
Figure 10B:
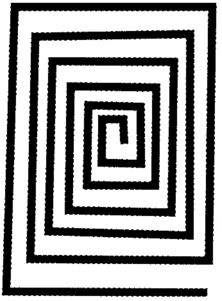

As set out above, agitation devices can include force generating devices. In some embodiments, these force generating devices can comprise at least one inductive array, such as an inductive coil, configured to generate a force for agitating fluid. The force generating device can cause a pulse of energy which causes movement which can move and detach bubbles from surfaces. Exemplary inductive array configurations are depicted in FIGS. 10A and 10B where these are shown from a plan view.

It will appreciated that in the above embodiments, the size, shape and dimension of the agitation device, hydrophilic coating and location, dimensions, shape, construction etc. of constituent parts can be optimized and modified depending on the specific requirements of the application. Manipulation of the material flowing through the channel and bubble entrapment region can be modified and optimized as required. For example, Depending on the material flowing through the channel and also the vent location, size, proximity and relative location to actuator and other factors related to the specific application it may be desirable to locate the second surface 561-561"" of FIGS. 7A-7F in different locations. Also different vent sizes, openings and shapes can be applied depending on the specifics of the application. Similarly, the size, shape, construction and location of the agitation device 760 of FIGS. 9A and 9B can be modified and optimized depending on the specifics of the application.

Figures 11A, 11B, 12:
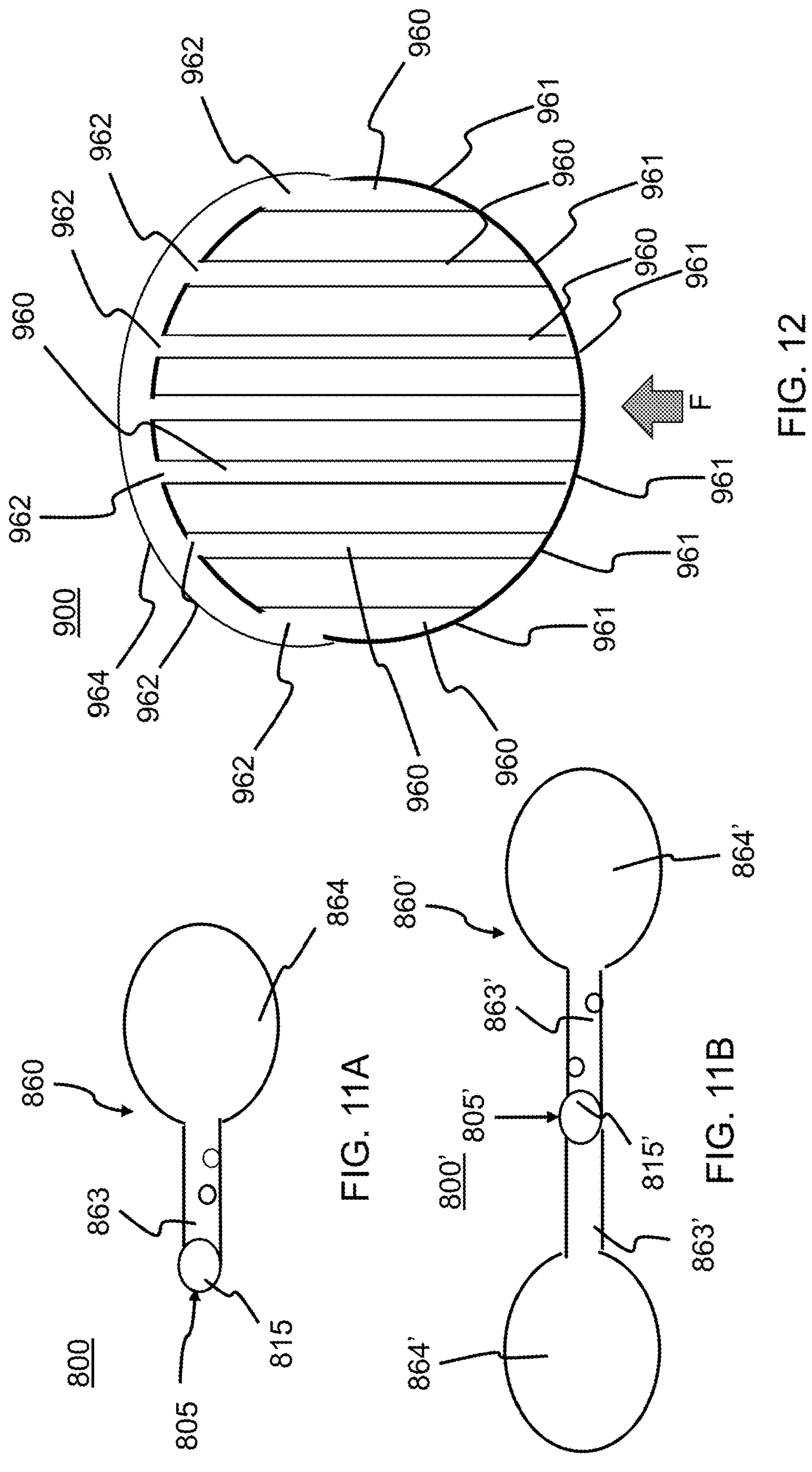
FIGS. 11A and 11B provide schematic plan views of systems according to embodiments.
FIG. 12 provides a schematic plan view of a system according to an embodiment.

FIGS. 11A and 11B provide schematic plan views of systems 800, 800' each comprising a sensing assembly 805, the sensing assembly defining a sensing surface 815, 815' configured to receive a liquid sample.

The systems 800, 800' each further comprise a bubble prevention arrangement 860, 860' arranged adjacent the sensing surface 815, 815' and configured to draw one or more bubbles from the sensing surface 815 to a bubble collection region. Specifically, the bubble prevention arrangement 860 of FIG. 10A comprises a channel 863 with an inlet arranged at the sensing surface 815 and configured to draw bubbles using capillary action to a reservoir 864 forming the bubble collection region. The bubble prevention arrangement 860' of FIG. 10B is similar but comprises two channels 863' with opposing inlets arranged either side of the sensing surface 815' and configured to draw bubbles using capillary action to a respective reservoir 864' forming the bubble collection region.

In other embodiments of the arrangement of FIGS. 11A and 11B, the sensing element may comprise a sensing layer (not depicted) in which pores are formed, for example, and interrogation of the sample is achieved by passing a sample through the pore. In such cases, the pores can provide the sensing surface. These can advantageously have the same configuration in which the bubble prevention arrangements 860, 860' draw bubbles from the vicinity of the pore.

FIG. 12 provides a schematic plan view of another system 900. The system comprises a sensing surface (not visible) over which is provided a series of parallel channels 960. The channels 960 are oriented in the direction of flow (F) and have an inlet 961 on one side of the sensing surface and an outlet at the other 962. Fluid within the channels 960 can be interrogated by the sensing surface. The presence of the array of channels 960 smooths flow and directs bubbles to a reservoir 964 on the outlet 962 side of the sensing surface and retains them therein.

Figures 13A, 13B, 14A, 14B:
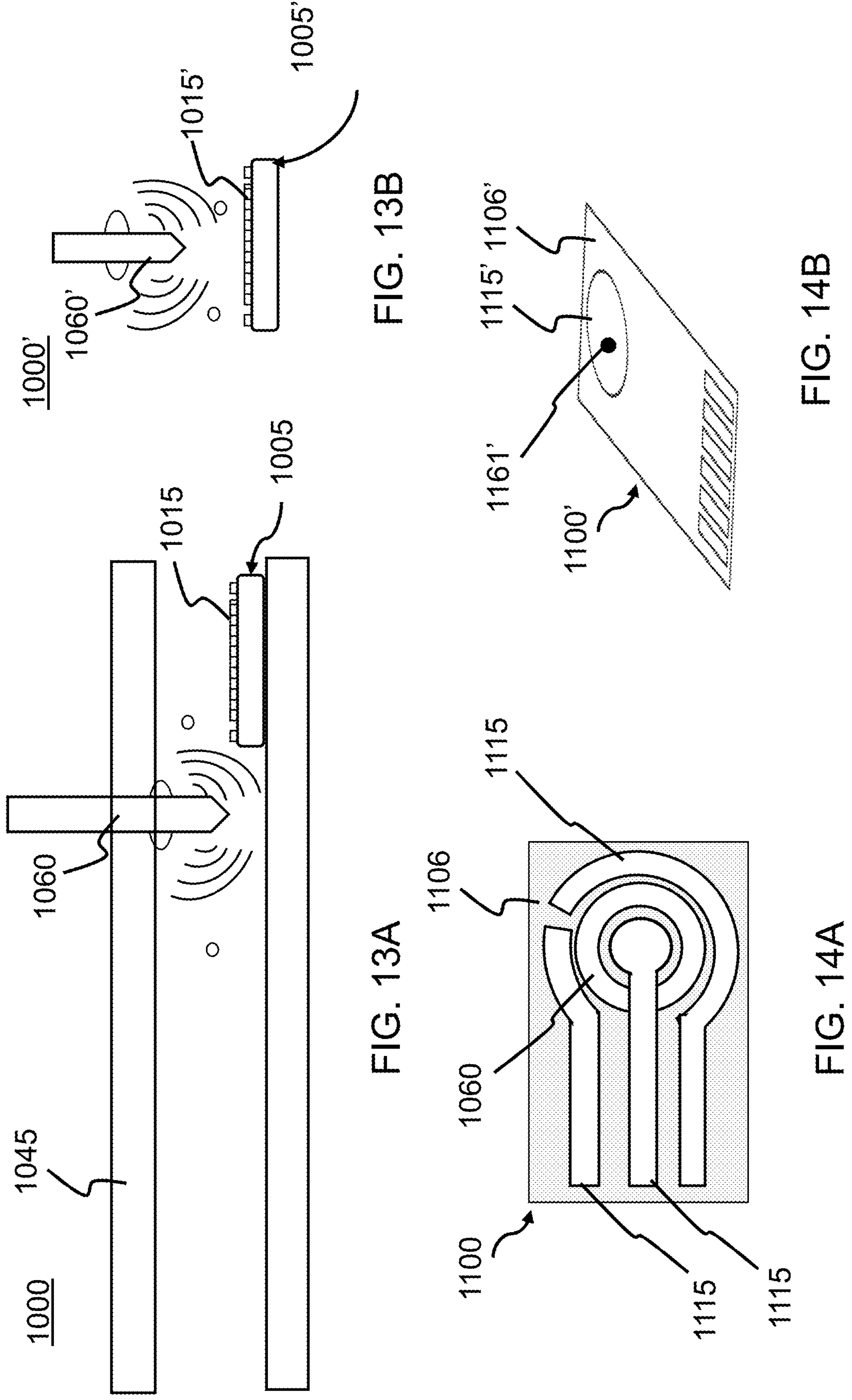
FIGS. 13A and 13B provide schematic cross-sectional views of systems according to embodiments.
FIG. 14A provides a schematic plan view of a system according to an embodiment.
FIG. 14B provides a schematic perspective view of a system according to an embodiment.

FIGS. 13A and 13B provide cross-sectional side views of systems 1000, 1000' according to further embodiments. In the embodiment depicted in FIG. 13A, there is a fluid channel 1045 in which there is located a sensing element 1005 defining a sensing surface 1015. Located within the fluid channel 1045 and adjacent to the sensing surface 1015 is an ultrasonic probe 1060 which is configured to agitate bubbles located in the fluid channel 1045 and on the surface of the sensing surface 1015 so as to remove them from the sensing surface 1015 and displace them from the vicinity of the sensing surface 1015. It will be appreciated that dimension and topography of the channel may be modified from that shown in FIG. 13A, for example depending on the use case for the ultrasonic probe (or agitation device, more generally).

FIG. 13B depicts a system 1000' in which there need not be a fluid channel and instead fluid can be directly applied to the sensing surface 1015' of the sensing element 1005'. In this embodiment, the ultrasonic probe 1060' is provided directly above the sensing surface and displaces bubbles from the sensing surface 1015' when actuated.

FIGS. 14A and 14B depict further embodiments of systems 1100, 1100'. FIG. 14A provides a plan view of a system 1000 in the form of a testing strip comprising a plurality of electrodes forming sensing surfaces 1115 arranged on a substrate 1006. The system 1100 also comprise an oxygen scavenger 1060 deposited on the substrate 1006 partially surrounding one of the sensing electrodes 1115 and adjacent the other sensing electrodes 115. This allows the scavenger 1060 to remove oxygen from liquid and in turn either reduce the likelihood of bubble formation or reduce the size of any bubbles on the substrate 1006.

FIG. 14B provides a top perspective view of a similar system 1100' in which there is an electrode provided on a substrate 1006' to define a sensing surface 1115' and an oxygen scavenger 1060'. In this embodiment, the oxygen scavenger 1060' is deposited on the sensing surface 1115' but leave sufficient surface area exposed to not impede measurement.

In alternative or additional embodiments to FIGS. 14A and 14B, a gas scavenger can be mixed with the liquid while on or prior to reaching the sensing surface. For example, this can be in a fluid channel, where present.

Figure 15:
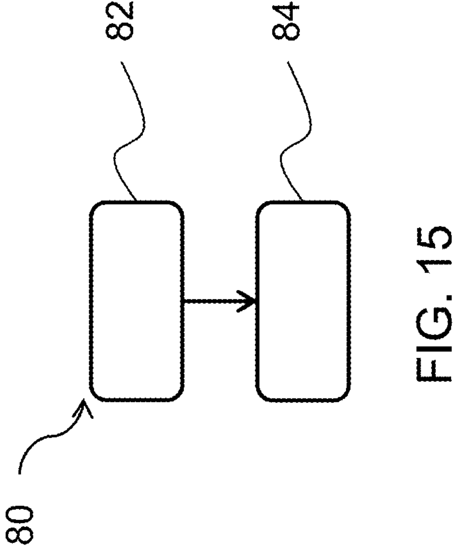
FIG. 15 provides a block diagram of a method according to an embodiment.

FIG. 15 depicts a method for reducing the interference of bubbles in a system for determining a property of a liquid 80, the method 80 comprising: providing a system according to any of the embodiments or aspects disclosed herein 82; providing a liquid 84 to the sensing surface; removing bubbles and/or dissolved gas from the liquid 86 using the bubble prevention arrangement; and determining a property of the liquid 88 using the sensing assembly.

It should be understood that the detailed description and specific examples, while indicating exemplary embodiments of the apparatus, systems and methods, are intended for purposes of illustration only and are not intended to limit the scope. These and other features, aspects, and advantages of the apparatus, systems and methods of the present disclosure can be better understood from the description, appended claims or aspects, and accompanying drawings. It should be understood that the Figures are merely schematic and are not drawn to scale. It should also be understood that the same reference numerals are used throughout the figures to indicate the same or similar parts.

Other variations to the disclosed embodiments can be understood and effected by those skilled in the art in practicing the disclosure, from a study of the drawings, the disclosure, and the appended aspects or claims. In the aspects or claims, the word "comprising" does not exclude other elements or steps, and the indefinite article "a" or "an" does not exclude a plurality. The mere fact that certain measures are recited in mutually different dependent aspects or claims does not indicate that a combination of these measures cannot be used to advantage. Any reference signs in the aspects or claims should not be construed as limiting the scope.

Aspects of the disclosure will now be set out, in which:

Aspect 1. A system for reducing interference by one or more bubbles in a liquid in a sensing assembly, the system comprising:

a sensing assembly comprising a sensing surface, the sensing surface being configured to receive the liquid and the sensing assembly configured to provide a measurement signal indicative of an interaction of the sensing surface with the liquid;

a fluid channel defining a flow path configured to provide liquid to the sensing surface, the fluid channel comprising a first surface; and a bubble prevention arrangement arranged in and/or fluidly connected to the fluid channel for preventing one or more bubbles from interfering with the sensing surface, the bubble prevention arrangement comprising a bubble collection region in which one or more bubbles can be collected, wherein the bubble prevention arrangement comprises a second surface located in the fluid channel; and wherein:

the bubble collection region comprises the second surface and the second surface has a higher affinity for bubbles relative to the first surface so that the second surface retains one or more bubbles within the bubble collection region; and/or the bubble collection region is separate to and fluidly connected to the fluid channel via an opening in the fluid channel and the second surface is configured to divert at least a portion of any bubbles passing through the fluid channel to the opening.

Aspect 2. The system of aspect 1, wherein the bubble collection region is separate to and fluidly connected to the fluid channel via an opening in the fluid channel and the second surface is configured to divert at least a portion of any bubbles passing through the fluid channel to the opening; and wherein the second surface is shaped or arranged so as to intercept and redirect at least a portion of any bubbles in the liquid through the opening and/or wherein the surface properties of the second surface are selected to attract bubbles and/or cause bubbles to adhere thereto so that these can be diverted to the opening.

Aspect 3. The system of aspect 1 or aspect 2, wherein the surface energy of the second surface is different to that of the first surface so as to provide the second surface with a higher affinity for bubbles in the liquid relative to the first surface.

Aspect 4. The system of any of aspects 1 to 3, wherein the surface energy of the second surface is lower than the surface energy of the first surface so as to provide the higher affinity.

Aspect 5. The system of any preceding aspect, wherein the bubble collection region is separate to and fluidly connected to the fluid channel via an opening in the fluid channel and the second surface is configured to divert at least a portion of bubbles passing through the fluid channel to the opening; and wherein the second surface is shaped to intercept at least a portion of any bubbles in the liquid present in the fluid channel and divert the bubbles to and through the opening and/or the surface properties of the second surface are selected so that second surface attracts bubbles from the liquid to the second surface and/or causes bubbles to adhere to the second surface so as to divert at least a portion of bubbles from the liquid to the opening.

Aspect 6. The system of aspect 5, wherein the second surface at least partly extends around the opening.

Aspect 7. The system of any preceding aspect, wherein the system further comprises a modification unit configured to modify the affinity of the sensing surface and/or the second surface to bubbles in the liquid.

Aspect 8. The system of any preceding aspect, further comprising an agitation device configured to agitate liquid within the fluid channel so as to:

cause dissolved gases in the liquid in the fluid channel to form bubbles, wherein the agitation device is arranged so that at least some of the formed bubbles can be collected in the bubble collection region; and/or direct one or more bubbles in the liquid to the second surface.

Aspect 9. The system of aspect 8, wherein the agitation device is provided upstream of the second surface and/or opposite the second surface.

Aspect 10. The system of any preceding aspect, wherein the system further comprises a bubble formation unit configured to cause dissolved gases in the liquid in the fluid channel to form bubbles, wherein the bubble formation unit is arranged so that bubbles are formed upstream of or at of the bubble prevention arrangement such that the bubble prevention arrangement can prevent at least a portion of the formed bubbles from interfering with the sensing surface.

Aspect 11. The system of any preceding aspect, wherein the bubble prevention arrangement further comprises a valve actuatable to release bubbles from the bubble collection region.

Aspect 12. The system of any preceding aspect, wherein the system further comprises a bypass channel fluidly connected to the fluid channel at a point downstream of the bubble prevention arrangement.

Aspect 13. The system of any preceding aspect, wherein the bubble collection region comprises the second surface and the second surface has a higher affinity for bubbles relative to the first surface so that the second surface retains one or more bubbles within the bubble collection region, and wherein the system further comprises at least one opening in the fluid channel and wherein the bubble collection region comprises a reservoir, secondary fluid channel and/or vent fluidly connected to the fluid channel via the at least one opening so that one or more bubbles can be diverted from the fluid channel to the reservoir, secondary fluid channel and/or vent.

Aspect 14. The system of any preceding aspect, wherein the system further comprises a pre-treatment unit arranged to pre-treat liquid so as to reduce the number of bubbles in the liquid and/or to reduce the likelihood of bubble formation.

Aspect 15. The system of aspect 14, wherein the pre-treatment unit is configured to apply a vacuum or pressure to the liquid.

Aspect 16. The system of any preceding aspect, further comprising a bubble trap comprising a trap channel located in the fluid channel and configured to draw a bubble into the trap channel and retain the bubble therein.

Aspect 17. The system of any preceding aspect, wherein the bubble prevention arrangement is further arranged adjacent the sensing surface and configured to displace one or more bubbles in a region on or adjacent the sensing surface from the sensing surface so as to reduce interference of bubbles on the sensing surface.

Aspect 18. A system for reducing interference by one or more bubbles in a liquid in a sensing assembly, the system comprising:

a sensing assembly comprising a sensing surface, the sensing surface being configured to receive the liquid and the sensing assembly configured to provide a measurement signal indicative of an interaction of the sensing surface with the liquid;

a fluid channel defining a flow path configured to provide liquid to the sensing surface; and a bubble collection region in which one or more bubbles can be collected; and a bubble prevention arrangement comprising an agitation device configured to agitate liquid within the fluid channel so as to:

cause dissolved gases in the liquid in the fluid channel to form bubbles, wherein the agitation device is arranged so that at least a portion of the formed bubbles can be collected in the bubble collection region; and/or direct one or more bubbles in the liquid to the collection region.

Aspect 19. The system of aspect 18, wherein the agitation device comprises at least one of: a sound-wave generating device configured to cause agitation of the liquid within the fluid channel, a force generating device configured to provide a force to the fluid channel to agitate liquid within the fluid channel; and an actuator comprising a moveable element configured to cause agitation of the liquid within the fluid channel.

Aspect 20. The system of aspect 19, wherein the agitation device comprises an actuator comprising a moveable element configured to cause agitation of the liquid within the fluid channel; and wherein the actuator is selected from a piezoelectric actuator, an electroactive polymer actuator and a thermal actuator.

Aspect 21. The system of aspect 20, wherein the moveable element is located within the fluid channel or is configured to move a part of the fluid channel so as to cause agitation of the liquid.

Aspect 22. The system of aspect 21, wherein the moveable element is a piezoelectric material or electroactive polymer material; or wherein the actuator comprises an actuator part comprising a piezoelectric material or an electroactive polymer material and the actuator part is configured to cause movement of the moveable element.

Aspect 23. The system of any of aspects 18 to 22, wherein the bubble collection region comprises a trap channel configured to draw a bubble into the trap channel and retain the bubble therein.

Aspect 24. The system of any of aspects 18 to 23, wherein the bubble collection region is separate to and fluidly connected to the fluid channel via an opening in the fluid channel; and wherein the agitation device is configured to divert at least a portion of bubbles passing through the fluid channel to the opening.

Aspect 25. The system of any of aspects 18 to 24, wherein the fluid channel has a first surface and wherein bubble prevention arrangement is arranged in and/or fluidly connected to the fluid channel for preventing one or more bubbles from interfering with the sensing surface, the bubble prevention arrangement comprising the bubble collection region and wherein the bubble prevention arrangement further comprising a second surface located in the fluid channel; and the bubble collection region comprises the second surface and the second surface has a higher affinity for bubbles relative to the first surface so that the second surface retains bubbles within the collection region; and/or the bubble collection region is separate to and fluidly connected to the fluid channel via an opening in the fluid channel and the second surface is configured to divert at least a portion of bubbles passing through the fluid channel to the opening.

Aspect 26. The system of aspect 25, wherein the surface energy of the second surface is different to that of the first surface so as to provide the second surface with a higher affinity for bubbles in the liquid relative to the first surface.

Aspect 27. The system of aspect 26, wherein the second surface at least partly extends around the opening.

Aspect 28. The system of any of aspects 25 to 27, wherein the system further comprises a modification unit configured to modify the affinity of the first surface and/or the second surface to bubbles in the liquid.

Aspect 29. The system of any of aspects 25 to 28, wherein the system further comprises a bubble formation unit configured to cause dissolved gases in the liquid in the fluid channel to form bubbles, wherein the bubble formation unit is arranged so that bubbles are formed upstream of or at of the bubble prevention arrangement such that the bubble prevention arrangement can prevent at least a portion of the formed bubbles from interfering with the sensing surface.

Aspect 30. The system of any of aspects 24 to 29, wherein the bubble collection region comprises a reservoir, secondary fluid channel or vent fluidly connected to the fluid channel via the at least one opening so that one or more bubbles can be diverted from the fluid channel to the reservoir or vent.

Aspect 31. The system of any of aspects 18 to 30, wherein the system further comprises a valve actuatable to release bubbles from the bubble collection region.

Aspect 32. The system of any of aspects 18 to 31, wherein the system further comprises a bypass channel fluidly connected to the fluid channel at a point downstream of the bubble collection region.

Aspect 33. The system of any of aspects 18 to 32, wherein the system further comprises a pre-treatment unit arranged to pre-treat liquid so as to reduce the number of bubbles in the liquid and/or to reduce the likelihood of bubble formation.

Aspect 34. The system of aspect 33, wherein the pre-treatment unit is configured to apply a vacuum or pressure to the liquid.

Aspect 35. The system of any of aspects 18 to 34, wherein the bubble prevention arrangement is further arranged adjacent the sensing surface and configured to displace one or more bubbles in a region on or adjacent the sensing surface from the sensing surface so as to reduce interference of bubbles on the sensing surface.

Aspect 36. A system for reducing interference by one or more bubbles in a liquid in a sensing assembly, the system comprising:

a sensing assembly comprising a sensing surface, the sensing surface being configured to receive the liquid and the sensing assembly configured to provide a measurement signal indicative of an interaction of the sensing surface with the liquid; and a bubble prevention arrangement arranged adjacent or on the sensing surface and configured to displace one or more bubbles in a region on or adjacent the sensing surface so as to reduce interference of one or more bubbles on the sensing surface.

Aspect 37. The system of aspect 36, wherein the bubble prevention arrangement comprises at least one channel with an inlet arranged adjacent or on the sensing assembly and configured to draw bubbles away from the region on or adjacent the sensing surface.

Aspect 38. The system of aspect 37, wherein the at least one channel is arranged and configured such that bubbles located adjacent the inlet are drawn into the channel away from the region on or adjacent the sensing surface using capillary action.

Aspect 39. The system of aspect 37 or aspect 38, wherein the system comprises a bubble trap, the bubble trap comprising the at least one channel as a trap channel configured to draw a bubble into the trap channel and retain the bubble therein.

Aspect 40. The system of any of aspects 37 to 39, wherein the bubble prevention arrangement comprises a plurality of channels arranged on or adjacent the sensing surface and configured to direct fluid across the sensing surface.

Aspect 41. The system of aspect 40, wherein the channels are configured as a plurality of parallel elongated channels extending across and parallel to at least one plane defined by the sensing surface.

Aspect 42. The system of any of aspects 36 to 41, wherein the bubble prevention arrangement comprises an agitation device configured to agitate liquid on the sensing surface so as to displace bubbles from the region on or adjacent the sensing surface.

Aspect 43. The system of aspect 42, wherein the agitation device comprises at least one of: a sound-wave generating device, a force generating device configured to provide a force to the sensing surface; and an actuator comprising a moveable element configured to cause agitation of the liquid on the sensing surface.

Aspect 44. The system of aspect 43, wherein the actuator comprises a moveable element configured to cause movement of the liquid and wherein the actuator is selected from a piezoelectric actuator, an electroactive polymer actuator and a thermal actuator.

Aspect 45. The system of aspect 43 or 44, wherein the force generating device comprises at least one inductive array configured to generate a force for agitating fluid on the sensing surface.

Aspect 46. The system of any of aspects 42 to 45, wherein the agitation device is configured to move the sensing surface so as to agitate fluid on the sensing surface.

Aspect 47. The system of any of aspects 42 to 46, wherein the agitation device is further configured to cause dissolved gases in the liquid on the sensing surface to form bubbles; and wherein the system is configured to remove the formed bubbles from the region on or adjacent the sensing surface.

Aspect 48. The system of any of aspects 36 to 47, further comprising a gas scavenger material provided adjacent the sensing surface.

Aspect 49. The system of any of aspects 36 to 48, wherein the bubbles are displaced to a bubble collection region.

Aspect 50. The system of any of aspects 36 to 49, further comprising a fluid channel defining a flow path configured to provide liquid to the sensing surface.

Aspect 51. The system of aspect 50, wherein the fluid channel comprises a first surface;

wherein the bubble prevention arrangement comprises a bubble collection region in which bubbles can be collected and comprises a second surface located in the fluid channel; and wherein:

the bubble collection region comprises the second surface and the second surface has a higher affinity for bubbles relative to the first surface so that the second surface retains bubbles within the bubble collection region; and/or the bubble collection region is separate to and fluidly connected to the fluid channel via an opening in the fluid channel and the second surface is configured to divert at least a portion of bubbles passing through the fluid channel to the opening.

Aspect 52. The system of aspect 51, wherein the bubble collection region is separate to and fluidly connected to the fluid channel via an opening in the fluid channel and the second surface is configured to divert at least a portion of bubbles passing through the fluid channel to the opening; and wherein the second surface is shaped or arranged so as to intercept and redirect bubbles in the liquid through the opening and/or wherein the surface properties of the second surface are selected to attract bubbles and/or causes bubbles to adhere thereto so that these can be diverted to the opening.

Aspect 53. The system of aspect 51 or aspect 52, wherein the surface energy of the second surface is different to that of the first surface so as to provide the second surface with a higher affinity for bubbles in the liquid relative to the first surface.

Aspect 54. The system of aspect 53, wherein the surface energy of the second surface is lower than the surface energy of the first surface so as to provide the higher affinity.

Aspect 55. The system of any of aspects 51 to 54, wherein the bubble collection region is separate to and fluidly connected to the fluid channel via an opening in the fluid channel and the second surface is configured to divert at least a portion of bubbles passing through the fluid channel to the opening; and wherein the second surface is shaped to intercept bubbles in the liquid present in the fluid channel and divert the bubbles to and through the opening and/or the surface properties of the second surface are selected so that second surface attracts bubbles from the liquid to the second surface and/or causes bubbles to adhere to the second surface so as to divert bubbles from the liquid to the opening.

Aspect 56. The system of aspect 55, wherein the second surface at least partly extends around the opening.

Aspect 57. The system of any of aspects 51 to 56, wherein the system further comprises a modification unit configured to modify the affinity of the first surface and/or second surfaces to bubbles in the liquid.

Aspect 58. The system of any of aspects 51 to 57, further comprises an agitation device configured to agitate liquid within the fluid channel so as to:

cause dissolved gases in the liquid in the fluid channel to form bubbles, wherein the agitation device is arranged so that formed bubbles can be collected in the bubble collection region; and/or direct bubbles in the liquid to the second surface.

Aspect 59. The system of aspect 58, wherein the agitation device is provided upstream of the second surface and/or opposite the second surface.

Aspect 60. The system of any of aspects 51 to 59, wherein the bubble prevention arrangement further comprises a valve actuatable to release bubbles from the bubble collection region.

Aspect 61. The system of any of aspects 51 to 60, wherein the system further comprises a bypass channel fluidly connected to the fluid channel at a point downstream of the bubble prevention arrangement.

Aspect 62. The system of any of aspects 51 to 61, further comprising at least one opening in the fluid channel and wherein the bubble collection region comprises a reservoir, secondary fluid channel or vent fluidly connected to the fluid channel via the at least one opening so that bubbles can be diverted from the fluid channel to the reservoir or vent.

Aspect 63. The system of any of aspects 51 to 62, further comprising a bubble trap comprising a trap channel located in the fluid channel and configured to draw a bubble into the trap channel and retain the bubble therein.

Aspect 64. The system of any of aspects 36 to 63, wherein the system further comprises a bubble formation unit configured to cause dissolved gases in the liquid to form bubbles.

Aspect 65. The system of any of aspects 36 to 64, wherein the system further comprises a pre-treatment unit arranged to pre-treat liquid so as to reduce the number of bubbles in the liquid and/or to reduce the likelihood of bubble formation.

Aspect 66. A method for reducing the interference of bubbles in a system for determining a property of a liquid, the method comprising:

providing a system according to any preceding aspect;

providing a liquid to the sensing surface;

removing bubbles and/or dissolved gas from the liquid using the bubble prevention arrangement; and determining a property of the liquid using the sensing assembly.

Aspect 67. The method of aspect 66, wherein providing a liquid comprises providing at least one of a liquid sample and a liquid calibration solution.

Aspect 68. The method of aspect 66 or 67, further comprising providing a surfactant or solvent to the sensing assembly providing the liquid to the sensing assembly.

Aspect 69. The method of any of aspects 66 to 68, wherein the system comprises a fluid channel defining a flow path configured to provide liquid to the sensing surface; and wherein:

the step of providing liquid to the sensing surface comprises providing a liquid to the fluid channel so as to provide fluid to the sensing surface; and the method further comprises providing a surfactant or solvent to the fluid channel prior to providing the liquid to the fluid channel.

Aspect 70. The method of any of aspects 66 to 69, further comprising pre-treating the liquid prior to determining a property of the liquid so as to reduce the number of bubbles in the liquid and/or to reduce the likelihood of bubble formation prior to the liquid being provided to the sensing assembly.

Aspect 71. The method of aspect 70, wherein the step of pre-treating comprises at least one of applying a vacuum to the liquid, applying pressure to the liquid, and/or providing a gas scavenger to the liquid.

Aspect 72. The method of any of aspects 66 to 71, further comprising determining a first property relating to the number of bubbles in the liquid.

Aspect 73. The method of aspect 72, wherein the step of removing bubbles and/or dissolved gas from the liquid using the bubble prevention arrangement is carried out based on the determined first property.

Aspect 74. The method of any of aspects 66 to 73, wherein the liquid is charged and wherein the method further comprises applying an opposing charge to the sensing surface so as to cause the liquid to cover the sensing surface.

Aspect 75. The method of any of aspects 66 to 74, wherein the liquid is provided to the sensing assembly in an environment having an oxygen content of at least 95% and wherein the step of removing bubbles and/or dissolved gas from the liquid comprises removing oxygen and/or dissolved oxygen from the liquid.

Aspect 76. A computer program comprising computer program code configured, when said computer program is run on one or more physical computing devices, to cause said one or more physical computing devices to implement the method according to any of aspects 66 to 75.

Aspect 77. One or more non-transitory computer readable media having a computer program stored thereon, the computer program comprising computer program code which is configured, when said computer program is run on one or more physical computing devices, to cause one or more physical computing devices to implement the method according to any of aspects 66 to 75.

The invention claimed is:

1. A system for reducing interference by one or more bubbles in a liquid in a sensing assembly, the system comprising:

a sensing assembly comprising a sensing surface, the sensing surface being configured to receive the liquid and the sensing assembly configured to provide a measurement signal indicative of an interaction of the sensing surface with the liquid;

a fluid channel defining a flow path configured to provide liquid to the sensing surface, the fluid channel comprising a first surface; and a bubble prevention arrangement arranged in and/or fluidly connected to the fluid channel for preventing one or more bubbles from interfering with the sensing surface, the bubble prevention arrangement comprising a bubble collection region in which one or more bubbles can be collected, wherein the bubble prevention arrangement comprises a second surface located in the fluid channel; and wherein:

the bubble collection region comprises the second surface and the second surface has a higher affinity for bubbles relative to the first surface so that the second surface retains one or more bubbles within the bubble collection region; and/or the bubble collection region is separate to and fluidly connected to the fluid channel via an opening in the fluid channel and the second surface is configured to divert at least a portion of any bubbles passing through the fluid channel to the opening.

2. The system of claim 1, wherein the bubble collection region is separate to and fluidly connected to the fluid channel via an opening in the fluid channel and the second surface is configured to divert at least a portion of any bubbles passing through the fluid channel to the opening; and wherein (i) the second surface is shaped or arranged so as to intercept and redirect at least a portion of any bubbles in the liquid through the opening and/or (ii) the surface properties of the second surface are selected to attract bubbles and/or cause bubbles to adhere thereto so that these can be diverted to the opening.

3. The system of claim 1, wherein the surface energy of the second surface is lower than the surface energy of the first surface so as to provide the higher affinity.

4. The system of claim 1, wherein the bubble collection region is separate to and fluidly connected to the fluid channel via an opening in the fluid channel and the second surface is configured to divert at least a portion of bubbles passing through the fluid channel to the opening; and wherein (i) the second surface is shaped to intercept at least a portion of any bubbles in the liquid present in the fluid channel and divert the bubbles to and through the opening and/or (ii) the surface properties of the second surface are selected so that second surface attracts bubbles from the liquid to the second surface and/or causes bubbles to adhere to the second surface so as to divert at least a portion of bubbles from the liquid to the opening.

5. The system of claim 4, wherein the second surface at least partly extends around the opening.

6. The system of claim 1, wherein the system further comprises a modification unit configured to modify the affinity of the sensing surface and/or the second surface to bubbles in the liquid.

7. A system for reducing interference by one or more bubbles in a liquid in a sensing assembly, the system comprising:

a sensing assembly comprising a sensing surface, the sensing surface being configured to receive the liquid and the sensing assembly configured to provide a measurement signal indicative of an interaction of the sensing surface with the liquid;

a fluid channel defining a flow path configured to provide liquid to the sensing surface; and a bubble collection region in which one or more bubbles can be collected; and a bubble prevention arrangement comprising an agitation device configured to agitate liquid within the fluid channel so as to:

cause dissolved gases in the liquid in the fluid channel to form bubbles, wherein the agitation device is arranged so that at least a portion of the formed bubbles can be collected in the bubble collection region; and/or direct one or more bubbles in the liquid to the bubble collection region.

8. The system of claim 7, wherein the agitation device comprises at least one of: a sound-wave generating device configured to cause agitation of the liquid within the fluid channel, a force generating device configured to provide a force to the fluid channel to agitate liquid within the fluid channel; and an actuator comprising a moveable element configured to cause agitation of the liquid within the fluid channel.

9. The system of claim 8, wherein the agitation device comprises an actuator comprising a moveable element configured to cause agitation of the liquid within the fluid channel and wherein the actuator is selected from a piezoelectric actuator, an electroactive polymer actuator and a thermal actuator.

10. The system of claim 9, wherein the moveable element is located within the fluid channel or is configured to move a part of the fluid channel so as to cause agitation of the liquid.

11. The system of claim 10, wherein the moveable element is a piezoelectric material or electroactive polymer material; or wherein the actuator comprises an actuator part comprising a piezoelectric material or an electroactive polymer material and the actuator part is configured to cause movement of the moveable element.

12. The system of claim 7, wherein the bubble collection region comprises a trap channel configured to draw a bubble into the trap channel and retain the bubble therein.

13. The system of claim 7, wherein the bubble collection region is separate to and fluidly connected to the fluid channel via an opening in the fluid channel; and wherein the agitation device is configured to divert at least a portion of bubbles passing through the fluid channel to the opening.

14. A method for reducing the interference of bubbles in a system for determining a property of a liquid, the method comprising:

providing a system according to claim 1;

providing a liquid to the sensing surface;

removing bubbles and/or dissolved gas from the liquid using the bubble prevention arrangement; and determining a property of the liquid using the sensing assembly.

15. The method of claim 14, further comprising pretreating the liquid prior to determining a property of the liquid so as to reduce the number of bubbles in the liquid and/or to reduce the likelihood of bubble formation prior to the liquid being provided to the sensing assembly.

16. The method of claim 15, wherein the step of pretreating comprises at least one of applying a vacuum to the liquid, applying pressure to the liquid, and/or providing a gas scavenger to the liquid.

17. The method of claim 14, further comprising determining a first property relating to the number of bubbles in the liquid; and wherein the step of removing bubbles and/or dissolved gas from the liquid using the bubble prevention arrangement is carried out based on the determined first property.

18. The method of claim 14, wherein the liquid is charged and wherein the method further comprises applying an opposing charge to the sensing surface so as to cause the liquid to cover the sensing surface.

19. A computer program comprising computer program code configured, when said computer program is run on one or more physical computing devices, to cause said one or more physical computing devices to implement the method according to claim 14.

20. One or more non-transitory computer readable media having a computer program stored thereon, the computer program comprising computer program code which is configured, when said computer program is run on one or more physical computing devices, to cause one or more physical computing devices to implement the method according to claim 14.

* * * * *